(12) United States Patent
Li

(10) Patent No.: US 6,487,014 B2
(45) Date of Patent: *Nov. 26, 2002

(54) HIGH ISOLATION OPTICAL SWITCH, ISOLATOR OR CIRCULATOR HAVING THIN FILM POLARIZING BEAM-SPLITTERS

(75) Inventor: Li Li, Orleans (CA)

(73) Assignee: National Research Council of Canada, Ottawa (CA)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 09/236,102

(22) Filed: Jan. 25, 1999

(65) Prior Publication Data

US 2002/0012168 A1 Jan. 31, 2002

Related U.S. Application Data

(63) Continuation-in-part of application No. 08/694,415, filed on Aug. 12, 1996, now Pat. No. 5,912,762.

(51) Int. Cl.[7] .................................. G02B 5/30
(52) U.S. Cl. ............... 359/484; 359/487; 359/495; 359/497; 359/498; 359/583; 359/900
(58) Field of Search ................. 359/484, 487, 359/494, 495, 496, 497, 498, 900, 583

(56) References Cited

U.S. PATENT DOCUMENTS

| | | | | |
|---|---|---|---|---|
| 2,403,731 A | * | 7/1946 | MacNeille | |
| 2,601,806 A | * | 7/1952 | Turner | |
| 3,026,763 A | * | 3/1962 | Marks | |
| 3,765,746 A | * | 10/1973 | Ashley et al. | |
| 4,084,883 A | * | 4/1978 | Eastman et al. | |
| 4,221,464 A | * | 9/1980 | Pedinoff et al. | |
| 4,272,159 A | * | 6/1981 | Matsumoto | 359/484 |
| 4,627,688 A | * | 12/1986 | Kobayashi et al. | |
| 4,650,289 A | * | 3/1987 | Kuwahara | 359/484 |
| 4,733,926 A | * | 3/1988 | Title | |
| 4,966,438 A | * | 10/1990 | Mouchart et al. | 359/495 |
| 5,466,564 A | * | 11/1995 | Blazey et al. | |
| 5,648,870 A | * | 7/1997 | Mistutake | |
| 5,912,762 A | * | 6/1999 | Li et al. | 359/498 |
| 5,982,541 A | * | 11/1999 | Li et al. | 359/498 |
| 6,285,423 B1 | * | 9/2001 | Li et al. | |
| 6,317,264 B1 | * | 11/2001 | Li et al. | |

FOREIGN PATENT DOCUMENTS

| | | | | |
|---|---|---|---|---|
| JP | 0137327 | * | 10/1981 | ......... 359/484 |
| JP | 56137317 | * | 10/1981 | |
| WO | 97 07418 | * | 2/1997 | |

OTHER PUBLICATIONS

Review of Compact Optical Isolators and Circulators; Kok Wai Chang—Hewlett–Packard Laboratories, Palo Alta, CA; OSA 97—Optical Communications & Measurement Department—Communications and Optics Research Laboratory.*

* cited by examiner

Primary Examiner—Ricky D. Shafer
(74) Attorney, Agent, or Firm—Marks & Clerk

(57) ABSTRACT

An optical device for controlling the flow of light between ports includes a pair of polarizing devices, which employ frustrated total internal reflection and interference in a thin film coating to reflect p-polarized light and to transmit s-polarized light. Polarization-rotating devices are used to rotate the polarization plane of the s- and p-polarized light beams so as to create optical switches, isolators and circulators using these polarizing devices.

31 Claims, 17 Drawing Sheets

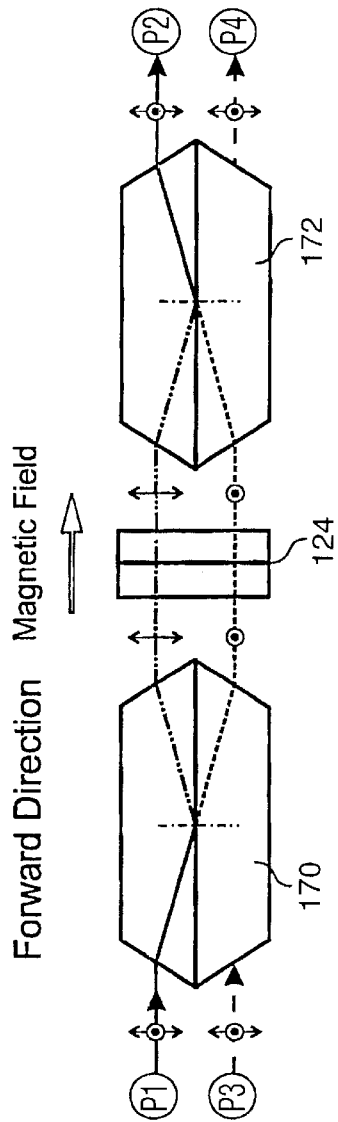
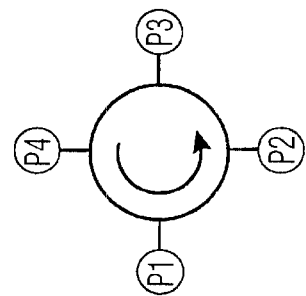
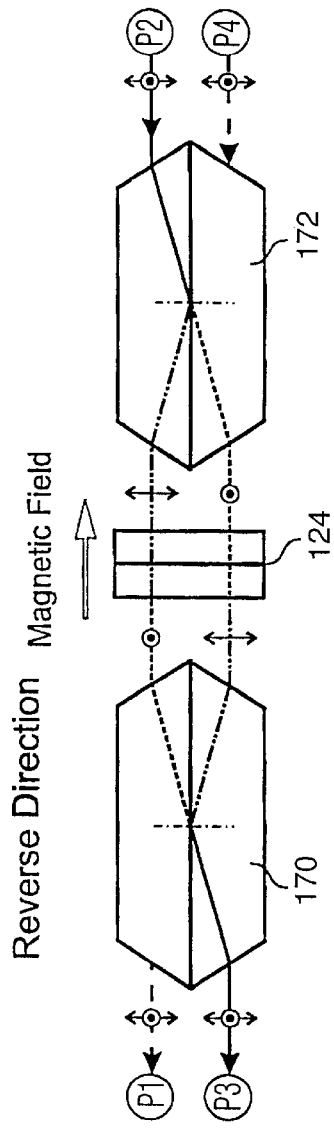

One Example of
Polarization- dependent isolator

HIGH ISOLATION OPTICAL SWITCH, ISOLATOR OR CIRCULATOR HAVING THIN FILM POLARIZING BEAM-SPLITTERS

CROSS REFERENCE TO RELATED APPLICATION

This application is a continuation-in-part of U.S. patent application Ser. No. 08/694,415, filed on Aug. 12, 1996 by Li Li and J. A. Dobrowolski, now U.S. Pat. No. 5,912,762.

FIELD OF INVENTION

This invention relates to an optical device such as an optical switch, optical isolator or optical circulator and, more particularly, to a polarization-independent, high-isolation optical device that uses a novel thin film polarizing beam-splitter.

BACKGROUND OF THE INVENTION

In fiber telecommunications, and in particular in wavelength division multiplexing, there is a need for high performance, low-cost and easily-producible optical switches, isolators and circulators. Optical switches are used to select fiber channels electronically. Optical isolators are commonly used in optical amplifiers that amplify fiber signals without using repeating stations. These optical amplifiers are pumped by diode lasers, which are very sensitive to any light reflected back to their cavities. Optical isolators can be used to isolate any reflected light going back to the lasers.

Recently, optical circulators have become very important in bi-directional fiber communications. In a multi-port circulator, signals go from port 1 to port 2, port 2 to port 3, port 3 to port 4, and so on, in stead of port 1 to port 2 and port 2 to port 1. For example, in Bragg grating wavelength division multiplexers (WDM), without using a circulator, the reflected signal would come out from the same port that the incident light goes in; as result, the incident light and the reflected light cannot be physically separated. However, if a three-port circulator is used, the reflected light will come out from a different port. In addition, optical circulators are also used in channel dropping and adding from and to main fiber lines.

Typically, an optical device such as an optical switch, isolator or circulator has a similar structure. It includes a polarization-rotating device sandwiched between two polarizing devices. The first polarizing device is used to separate the incident beam into two orthogonal polarized light beams and the second polarizing device is used to combine the two orthogonal polarized light beams into one output beam. For a polarization dependent optical switch isolator or circulator, only one polarized light is used. The polarization-rotating device normally consists of a reciprocal device or a non-reciprocal device, or the combination thereof.

A typical reciprocal device is a waveplate such as a quarterwave plate or halfwave plate. A quarterwave plate changes a linear polarized light into a circular polarized light if its optical axis is aligned 45° with regard to the polarization of the incident linear polarized beam. A halfwave plate rotates the polarization of a linear polarized light by any angle depending on the alignment of its optical axis with regard to the polarization of the incident beam.

A typical non-reciprocal device is a Faraday rotator. When a magnetic field is applied to the Faraday rotator, it rotates the electric field of a linear polarized light by a certain angle. The rotational angle depends on the property and the length of the Faraday rotator as well as the strength of the magnetic field. The direction of the rotation depends on the direction of the magnetic field. Therefore, the polarization plane of the light beam is rotated in the same direction for light coming from both directions. This is why such a device is called non-reciprocal device.

Normally, such an optical device has several input and output ports. For an optical switch, the output beam is switched between the several output ports electronically. In order to do this, a mechanism is applied to alter the direction of the magnetic field, for example, an electric coil can be used in which the current can be switched on in both directions. For an optical isolator, the light comes in reverse direction is not used and is directed to a port that is different from the incident port. To use as an optical circulator, the signals circulate between all the ports.

Currently, optical switches, isolators and circulators are mainly based on birefringent polarizing devices such as birefringent polarizers, wedge polarizers or walk-off polarizers, for example, U.S. Pat. Nos. 5,446,578 and 5,734,763 by Chang and U.S. Pat. Nos. 5,581,640, 5,566,259, 5,557,692, 5,706,371 by Pan et al. Sometimes absorbing plate polarizers are also used in optical devices which are polarization-dependent.

Although birefringent polarizers have the advantage of having high extinction ratios, there are several disadvantages resulting from their use. First, birefringent polarizers are expensive. Second, these polarizers have birefringent effects that result in polarization mode dispersion. In order to overcome this problem, other birefringent plates or a second identical stage are added to compensate this polarization dispersion. Both approaches require the use of more birefringent plates or polarizers, and this makes it very expensive and very difficult to assemble since the optical axes of all the birefringent elements need to be accurately aligned. Third, the most common configuration in conventional optical isolators or circulators uses walk-off birefringent polarizers to separate ordinary (o) and extra-ordinary (e) rays physically. This separation depends on the refractive index difference between o- and e-rays and the size of the birefringent material. The greater the separation, the easier it is to package and the better the performance. However, since the refractive index differences depend on the available birefringent materials which are limited, so an increase in the separation means an increase in the size of the birefringent plate. As a result, it is more expensive because the greater the size, the more expensive the birefringent materials. Fourth, it is difficult to make an N multi-port optical circulator based on birefringent materials with the number of ports N larger than four.

Conventional thin film polarizing devices such as thin film polarizers or thin film polarizing beam-splitters (PBS), including MacNeille polarizers or thin film cube or plate polarizers, have been proposed for use as polarizing devices in optical switches, isolators and circulators. For example, one example of the optical circulator was described in U.S. Pat. No. 4,272,159 by Matsumoto. The thin film interference polarizers and PBSs consist of multilayers of dielectric films deposited onto glass or other substrates. Such polarizers reflect s-polarized light and transmit p-polarized light and are normally based on the light interference in thin films, sometimes also in combination with other effects.

Although conventional thin film polarizing devices are versatile in terms of design and are not limited by size and are easier to make and hence less expensive, one of their biggest disadvantages is the low extinction ratio (less than 30 dB isolation), especially in the reflected beams. In addition, the bandwidth of the thin film cube or plate polarizers is very small. Another disadvantage is that their angular field is very small, and they therefore require well collimated light beams. As a result, any optical device based on these conventional thin film polarizing devices will suffer the same low extinction ratio problem. In addition, they are more difficult to package because of the small angular fields. Such optical switches isolators and circulators can only be used in the areas where high extinction ratios are not required. For high performance devices, such as those used in fiber communications, the market is dominated by the birefringent materials.

The most commonly used thin film polarizers are the MacNeille polarizer which was invented by MacNeille in 1946. It is based on the Brewster angle phenomenon and light interference in thin films. When light is incident at the interface between a high and low refractive index materials, if the incident angle is equal to the Brewster angle, all the p-polarized light is transmitted and s-polarized light is partially reflected. In order to increase the reflection for s-polarized light, a multilayer interference coating consisting of the high and low index materials are used. The coating is sandwiched between two glass prisms, which is required by the Brewster angle requirement. The multilayer coating acts as a high reflector for the s-polarized light and does not affect the transmission of the p-polarized light at the Brewster angle. The reflection band for s-polarized light depends on the refractive index ratio of the high and low index materials and can be extended by chirping the layer thickness or by using several layer stacks. Hence, the MacNeille polarizer is broad band; however, it is very sensitive to the variation of the angles of incidence. Once the incident angle moves away from the Brewster angle (±2°), the performance of the polarizer deteriorates dramatically. In addition, the extinction ratio for the reflected beam is low because the index-mismatch between the prism substrate and the coating materials.

Another thin film PBS (polarizing beam splitter) is based on the edge separation between s- and p-polarized light of an edge filter at an oblique angle of incidence. In this separation region, s-polarized light is reflected and p-polarized light is transmitted. Its angular field is relatively large compared to MacNeille polarizer. The extinction ratio of such polarizer can be very high in the transmitted beam if a large number of layers are used to reflecting s-polarized light. However, a high extinction ratio can not be achieved for the reflected beam. In addition, such a polarizer has a very small bandwidth. As a result, it is often used for narrow band applications such as lasers.

It is therefore an object of the present invention to provide a low-cost, high isolation and polarization-independent optical device that can be used as an optical switch, isolator or circulator.

SUMMARY OF THE INVENTION

In its most general aspect the invention provides an optical device for controlling the flow of light between ports, comprising a pair of thin film polarizing devices, the improvement wherein said thin film polarizing devices employ frustrated total internal reflection and interference in a thin film coating to transmit s-polarized light and to reflect p-polarized light.

It will be understood by one skilled in the art that a thin film coating typically consists of multilayers formed on a substrate.

Typical thin film polarizing devices are polarizers or polarizing beam splitters (PBS). It will be understood that depending of the direction of light, such polarizing devices can be used to split unpolarized light into separate s- and p-polarized beams or to combine such separately polarized beams into a single unpolarized beam. The term polarizing device in this specification covers such devices whether functioning as beam splitters or beam combiners. Several parameters that are used to describe the performance of a polarizing device are:

1. the wavelength range, which is the range over which the polarizing device is effective;

2. the angular field, which is the angular field of the incident light in which the polarizing device is effective;

3. the extinction ratio, which is the ratio of the desired polarized light to the unwanted polarized light after the light passes through or is reflected from the polarizing device; and, 4. the transmittance or reflectance for the desired polarization.

Polarizing devices employed in the invention are non-absorbing, and have broadband wavelengths, wide angular fields and high extinction ratios, also are easier and less expensive to manufacture. In a typical application, one polarizing device functions as a beam splitter to split incident unpolarized light into separate s- and p- polarized beams and the other polarizing device functions to combine the beams into a single unpolarized beam. A polarization-rotating device, which may be either reciprocal or non-reciprocal, may be placed in the respective p- and s- polarized beams. Such an arrangement can be used to make multi-port optical switches, isolators or circulators.

In a preferred embodiment a first of the polarizing devices splits a light beam incident at a first port into a reflected p-polarized beam and a transmitted s-polarized beam, and a second of said polarizing devices combines a p-polarized beam and a s-polarized into a combined unpolarized output beam at a second port. A polarization-rotating device, such as a Faraday rotator, can be inserted in the beams to control the flow of light between the ports and thus create optical switches, isolators or circulators. Such devices do not have polarization mode dispersion if a symmetrical configuration is used. The insertion loss in these devices can be small as well. The optical device can also be made polarization dependent, in which case only one polarized beam is used. A single polarizing device directs incident polarized light through the input port of a polarization-rotating device to a reflecting surface, from where it is reflected back into the polarizing device, with its plane of polarization changed. The reflected beam appears at an output port.

BRIEF DESCRIPTION OF DRAWINGS

The invention will now be described in more detail, by way of example, with reference to the accompanying drawings, in which:

FIGS. 17a and 17b are cross sectional views, and FIG. 17c is a schematic diagram showing the working principle, of the fifth embodiment of an optical device in accordance with the principles of the present invention;

DETAILED DESCRIPTION OF THE INVENTION

The optical device described herein uses a novel thin film polarizing device disclosed in U.S. patent application Ser. No. 08/694,415, filed on Aug. 12, 1996 by Li Li and J. A. Dobrowolski, now U.S. Pat. No. 5,912,762, and also in a paper by Li Li and J. A. Dobrowolski presented in June 1998 at the Topical Meeting on Optical Interference Coatings.

Figure 1:
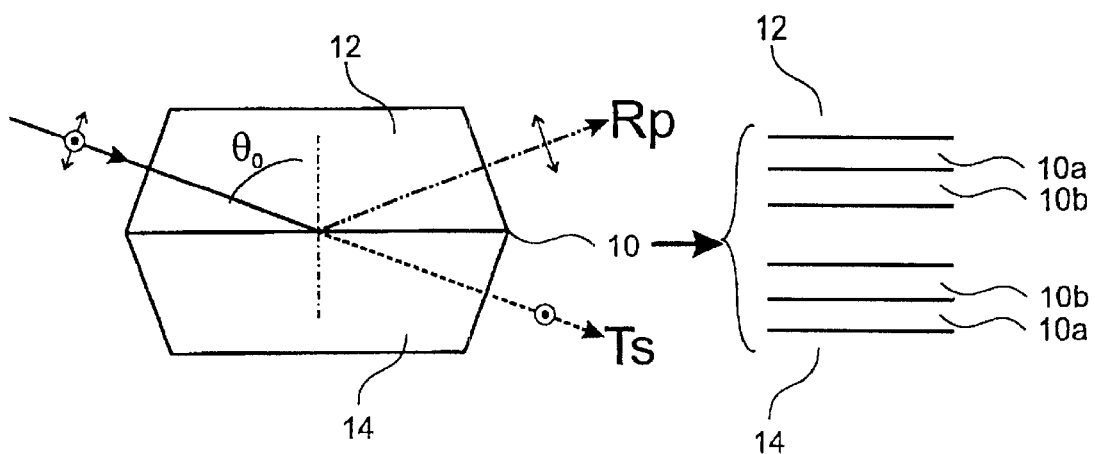
FIG. 1 shows a typical configuration of the novel thin film polarizing device disclosed in U.S. patent application Ser. No. 08/694,415.

FIG. 1 shows a typical configuration of the novel thin film polarizing device. The thin film polarizing coating 10 consists of a stack of alternate low and high refractive index layers 10a, 10b sandwiched between two high refractive index substrates 12 and 14. This novel thin film polarizing device is based on the effects of the frustrated total internal reflection and light interference in thin films as more fully described in the above patent application, the contents of which are incorporated herein by reference. As described in the above U.S. patent, the thicknesses of the thin film layers are such that an equivalent optical admittance of the plurality of the thin film layers for s-polarized light is substantially the same as an optical admittance of the substrate for s-polarized light for range of angles of incidence and a band of wavelengths when the incident light is incident upon the low refractive index layers at an angle greater that the critical angle. As a result substantially all incident s-polarized light is substantially transmitted. The plurality of the thin film layers have an equivalent optical admittance for p-polarized light that is substantially different from the optical admittance of the substrate for p-polarized light for a range of angles of incidence and a band of wavelengths. As a result, substantially all the incident p-polarized light is reflected.

The incident angle $\theta_0$ in the prism is larger than the critical angle for the low index layers. Unlike conventional thin film polarizers or PBSs, this thin film polarizing device reflects p-polarized light and transmits s-polarized light. More importantly, the polarizing device is at the same time non-absorbing, broad band, wide-angle and it has very high extinction ratios (several orders of magnitude higher than conventional thin film PBSs) and high transmittance and reflectance for the desired polarization. The theory of such a polarizing device has been explicitly described in U.S. patent application Ser. No. 08/694,415 and in the paper by Li Li and J. A. Dobrowolski, which is herein incorporated by reference.

Theory of the Novel Thin Film Polarizing Device

Since the thin film polarizing device can function either as a beam-splitter or beam-combiner as explained above already, this functionality does affect the theory of the thin film polarizing device. In the following section, for simplicity, the term thin film polarizing beam-splitter (PBS) is used to refer to the thin film polarizing device instead. It is understood that both terms are interchangeable.

a. Equivalent Layer Concept

The theory of the novel thin film polarizing beam-splitter can be derived with the help of the equivalent layer concept.

Mathematically, a symmetrical thin film structure $|d_1(A) d_2(B) d_1(A)|$ can be replaced by a single layer with an equivalent admittance E and an equivalent phase thickness $\Gamma$. Here, A and B represent two different layers with refractive index $n_1$ and $n_2$, and thickness $d_1$ and $d_2$, respectively. As a result, a multilayer system $n_0 |[d_1(A) d_2(B) d_1(A)]^N| n_0$ can then be replaced by $n_0 |(E, N\Gamma)| n_0$. Here N is the number of periods. The analytical equations for both the E and $\Gamma$ at normal incidence were described in the book, "Applied Optical Thin Films" by J. F. Tang in Equation (1).

$$E = \sqrt{\frac{\eta_1^2 \left(\sin 2\delta_1 \cos\delta_2 + \frac{1}{2}(\eta_1/\eta_2 + \eta_2/\eta_1)\cos 2\delta_1 \sin\delta_2 - \frac{1}{2}(\eta_1/\eta_2 - \eta_2/\eta_1)\sin\delta_2\right)}{\left(\sin 2\delta_1 \cos\delta_2 + \frac{1}{2}(\eta_1/\eta_2 + \eta_2/\eta_1)\cos 2\delta_1 \sin\delta_2 + \frac{1}{2}(\eta_1/\eta_2 - \eta_2/\eta_1)\sin\delta_2\right)}} \quad (1)$$

$$\Gamma = \arccos\left(\cos 2\delta_1 \cos\delta_2 + \frac{1}{2}(\eta_1/\eta_2 + \eta_2/\eta_1)\sin 2\delta_1 \sin\delta_2\right)$$

Where,

-continued $$\begin{cases} \delta_1 = \dfrac{2\pi}{\lambda} n_1 d_1 \cos\theta_1 \\ \delta_2 = \dfrac{2\pi}{\lambda} n_2 d_2 \cos\theta_2 \end{cases} \quad (2)$$

where,

Equation (1) can also be applied to non-normal incidence by replacing $\eta_1$ and $\eta_2$ with Equation (3):

$$\begin{cases} \eta_0 = \eta_{0S} = n_0 \cos\theta_0 \\ \eta_1 = \eta_{1S} = n_1 \cos\theta_1 \quad (s-pol), \\ \eta_2 = \eta_{2S} = n_2 \cos\theta_2 \end{cases} \begin{cases} \eta_0 = \eta_{0P} = n_0/\cos\theta_0 \\ \eta_1 = \eta_{1P} = n_1/\cos\theta_1 \quad (p-pol) \\ \eta_2 = \eta_{2P} = n_2/\cos\theta_2 \end{cases} \quad (3)$$

Where $\theta_0$, $\theta_1$ and $\theta_2$ are the incident angles in the substrate $n_0$ and in the high and low index layers with refractive indices $n_1$ and $n_2$, respectively.

b. Simplified Equations for the Equivalent Layer

If the layers are very thin, for example, $d_1$ and $d_2$ are small, then $$\begin{cases} \cos(\delta_1) \cong 1 \\ \cos(\delta_2) \cong 1, \end{cases} \begin{cases} \sin(\delta_1) \cong \delta_1 \\ \sin(\delta_2) \cong \delta_2 \end{cases} \quad (4)$$

Equation (1) can be modified for both s- and p-polarized light as:

$$\begin{cases} E_S = \sqrt{\dfrac{2d_1(n_1^2 - n_0^2) + d_2(n_2^2 - n_0^2)}{(2d_1 + d_2)} + n_0^2 \cos^2\theta_0} \\ \Gamma_S = \arccos\left(1 - \dfrac{4\pi^2 d_1 d_2(n_1^2 - n_2^2)}{\lambda^2}\right) \end{cases} \quad (5)$$

$$\begin{cases} E_P = \sqrt{\dfrac{(2d_1 n_1^2 + d_2 n_2^2) n_1^2 n_2^2}{(2d_1 + d_2)n_1^2 n_2^2 - (2d_1 n_2^2 + d_2 n_1^2) n_0^2 \sin^2\theta_0}} \\ \Gamma_P = \arccos\left(1 - \dfrac{4\pi^2 d_1 d_2 \left((n_1^2 - n_2^2) - \left(\dfrac{n_1^2}{n_2^2} - \dfrac{n_2^2}{n_1^2}\right) n_0^2 \sin^2\theta_0\right)}{\lambda^2}\right) \end{cases} \quad (6)$$

In equation (5), if $$\dfrac{2d_1(n_1^2 - n_0^2) + d_2(n_2^2 - n_0^2)}{(2d_1 + d_2)} = 0, \text{ then} \quad (7)$$

$$d_2 = \dfrac{(n_1^2 - n_0^2)}{(n_0^2 - n_2^2)} 2d_1$$

Replace $d_2$ in Equation (5):

$$\begin{cases} E_S = \sqrt{\dfrac{2d_1(n_1^2 - n_0^2) + d_2(n_2^2 - n_0^2)}{(2d_1 + d_2)} + n_0^2 \cos^2\theta_0} = n_0 \cos\theta_0 = \eta_{0S} \\ \Gamma_S = \arccos\left(1 - \dfrac{8\pi^2 d_1^2(n_1^2 - n_0^2)(n_1^2 - n_2^2)}{\lambda^2(n_0^2 - n_2^2)}\right) \end{cases} \quad (8)$$

The above results indicate that $E_S$ matches $\eta_{0S}$ completely. Therefore, the symmetrical structure behaves like a perfect antireflection coating for s-polarized light. It transmits all s-polarized light independent of wavelengths and angles of incidence. The equivalent phase thickness is a function of $d_1$, $n_0$, $n_1$, $n_2$ and the wavelength $\lambda$.

From the above equation, it is obtained that, $$d_2 = \dfrac{(n_1^2 - n_0^2)}{(n_0^2 - n_2^2)} 2d_1 \quad (9)$$

As long as $n_1 \leq n_0 \leq n_2$ or $n_2 \leq n_0 \leq n_1$, there is always a non-negative solution for $d_2$.

For p-polarized light, replaced $d_2$ with equation (9), $E_P$ and $\Gamma_P$ in equation (6) can be simplified as:

$$E_P = \pm\sqrt{\dfrac{n_0^2 n_1^2 n_2^2}{n_1^2 n_2^2 - (n_1^2 + n_2^2 - n_0^2) n_0^2 \sin^2\theta_0}} \quad (10)$$

$$\Gamma_P = \arccos\left(1 - \dfrac{8\pi^2 d_1^2(n_1^2 - n_2^2)(n_1^2 - n_0^2)\left(1 - \left(\dfrac{n_1^2 + n_2^2}{n_1^2 n_2^2}\right) n_0^2 \sin^2\theta_0\right)}{\lambda^2(n_0^2 - n_2^2)}\right) \quad (11)$$

Since $n_0^2 n_1^2 n_2^2$ is always greater than zero, if $$n_1^2 n_2^2 - (n_1^2 + n_2^2 - n_0^2) n_0^2 \sin^2\theta_0 < 0 \quad (12)$$

$E_P$ will have an imaginary value and a negative sign should be chosen in front of equation (10).

From equation (12), we obtain:

$$\sin^2\theta_0 > \dfrac{n_1^2 n_2^2}{n_0^2(n_1^2 + n_2^2 - n_0^2)} =$$

$$\begin{cases} \sqrt{\dfrac{n_1^2}{n_0^2\left(1 - \dfrac{n_0^2 - n_1^2}{n_2^2}\right)}} > \dfrac{n_1}{n_0} = \sin\theta_C, \text{ if } n_1 < n_0 < n_2 \\ \sqrt{\dfrac{n_2^2}{n_0^2\left(1 - \dfrac{n_0^2 - n_2^2}{n_1^2}\right)}} > \dfrac{n_2}{n_0} = \sin\theta_C, \text{ if } n_2 < n_0 < n_1, \end{cases}$$

where $\theta_C$ is the critical angle defined as the above equation. Therefore, there exists a lower-limit angle $\theta_{LL}$ is defined as:

$$n_0 \sin\theta_{LL} = \dfrac{n_1 n_2}{\sqrt{(n_1^2 + n_2^2 - n_0^2)}} \quad (13)$$

As long as $\theta_0$ is larger than $\theta_{LL}$ and smaller than 90°, the condition of a negative imaginary $E_P$ is always satisfied. A negative $E_P$ means that the symmetrical thin film structure acts like a perfect metal, it always reflects p-polarized light. There is no absorption. The actual reflectance depends on the absolute value of $E_P$ and $\Gamma_P$. If the symmetrical thin film structure is thick enough, virtually all the p-polarized light is reflected, no p-polarized light is transmitted.

Therefore, the conditions are obtained for the design of a broadband, wide angle and high extinction ratio polarizing beam-splitter. The two most important conditions are described in equations (9) and (13) that give the insight on how to select thin film coating parameters and the design angles for the novel thin film polarizing beam-splitter. In the actual thin film polarizing beam-splitter design process, an initial design is first obtained from the above two equations. Then a thin film computer optimization procedure is used to optimize the thickness of each individual layer according to the specified performance requirements. As a result, the actual coating designs might not be symmetrical anymore.

In addition, the thickness might be changed as well and they could be rather thick.

Embodiments of Thin Film PBSs

Several thin film PBS embodiments having thin film PBS coatings PBS-1A, PBS 1B, PBS-2, PBS-3 and PBS-4 have been designed for an optical device, such as an optical switch, isolator or circulator in accordance with the present invention. For comparison, the designed wavelength range is kept between 1450 - 1650 nm for all thin film PBS coatings. The extinction ratios for both transmitted and reflected beams are also kept close to or better than $10^6:1$. In other words, the isolation for the undesired polarization is close or better than 60 dB. The thin film PBS coatings are mostly based on the optical constants published in the book, "Optical constants of Solids I" and "Optical Constants of Solids II", edited by E. Palik, and published in 1986 and 1991, respectively. Some measured optical constants of some materials by the inventor's laboratory are also used. The initial thin film PBS coatings were obtained from equation (9) and (13). Afterwards, the thicknesses of the coatings were optimized according to the specified performance requirements. The final parameters of all the thin film PBS coatings are listed in Table 1 below.

The center design angle $\theta_0$ in the above PBS embodiment is 45°. This arrangement is desirable because it results in the minimum prism size for a given size of the accepting-surface. However, it requires the use of high index materials. According to equation (13), if the coatings materials are chosen to be Si and $SiO_2$, the substrate material has to have a refractive index higher than the refractive index of $SiO_2$ but smaller or equal to the refractive index of Si.

Figure 3:
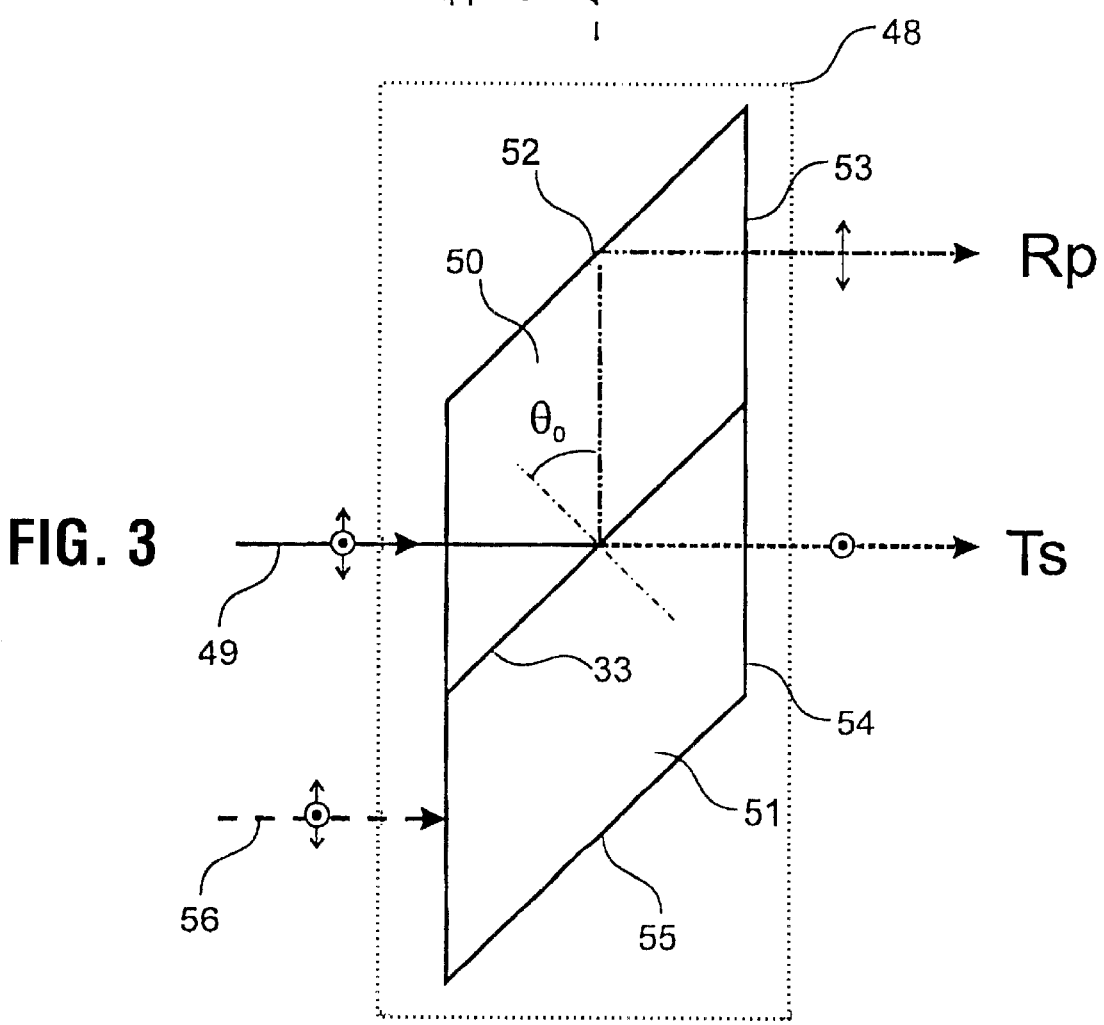
FIG. 3 shows the configuration of a variation of the first PBS embodiment.
Figures 19A, 19B:
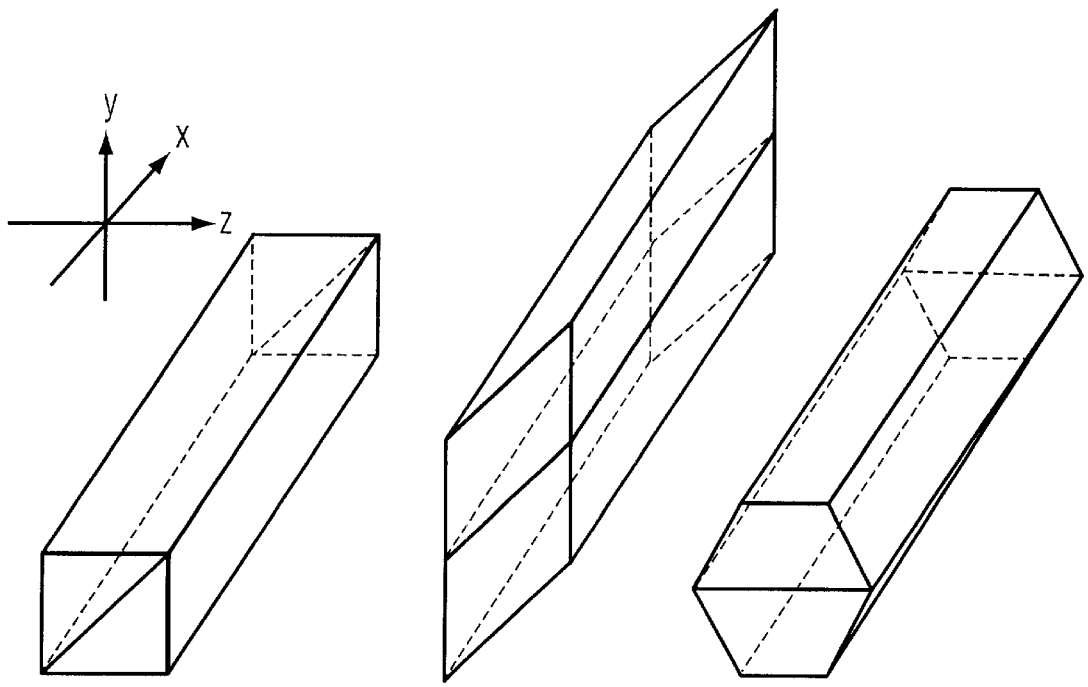
FIGS. 19A, 19AA, 19B, 19C and 19D are an in-depth perspective view of the PBS embodiments that can be used in multi-port optical devices in accordance with the present invention.

A variation of the first PBS embodiment 48 is shown in FIG. 3 and FIG. 19AA. The center design angle $\theta_0$ is also 45°. It consists of all the similar elements as in the first PBS embodiment. However, in stead of using two right angle prisms, two identical parallel thick plates 50 and 51 forming a rhomboidal prism are used. The thin film PBS coating 33 lies between the two thick plates 50, 51. An unpolarized light beam 49 is separated into two polarized beams by the thin film PBS coating 33. The p-polarized light is first reflected by the thin film PBS coating and then totally reflected by the surface 52 because the incident angle at this surface is larger than the critical angle. As a result, the p-polarized light exits the light-accepting surface 53 parallel to the incident beam 49. The s-polarized light is transmitted by the thin film PBS coating and exits the light-accepting surface 54 in the same direction as the incident beam. For the unpolarized light beam 56, it is first totally reflected by the surface 55 and then is incident upon the thin film PBS coating and goes through a similar process as the light beam 49. Such a PBS configuration is desirable in some optical device embodiments in accordance with the present invention.

Figure 2:
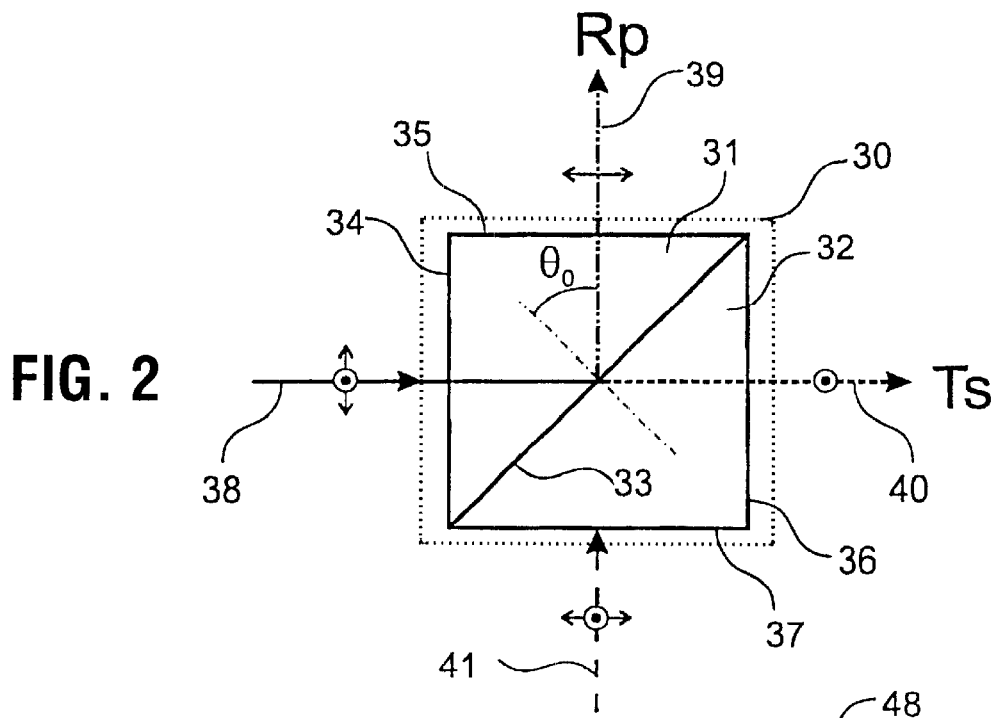
FIG. 2 shows the configuration of the first PBS embodiment.
Figure 4A:
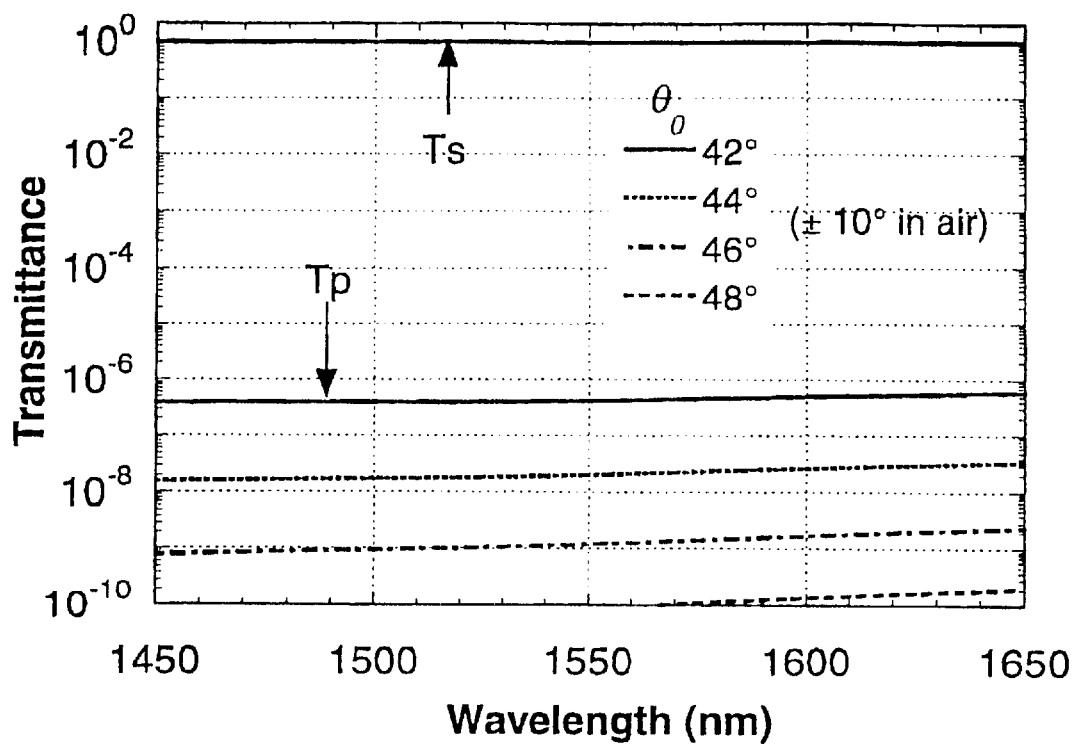
FIGS. 4a and 4b show the calculated transmittance and reflectance of a polarizing beam-splitter coating (PBS-1A) at different angles of incidence for the first PBS embodiment.
Figure 4B:
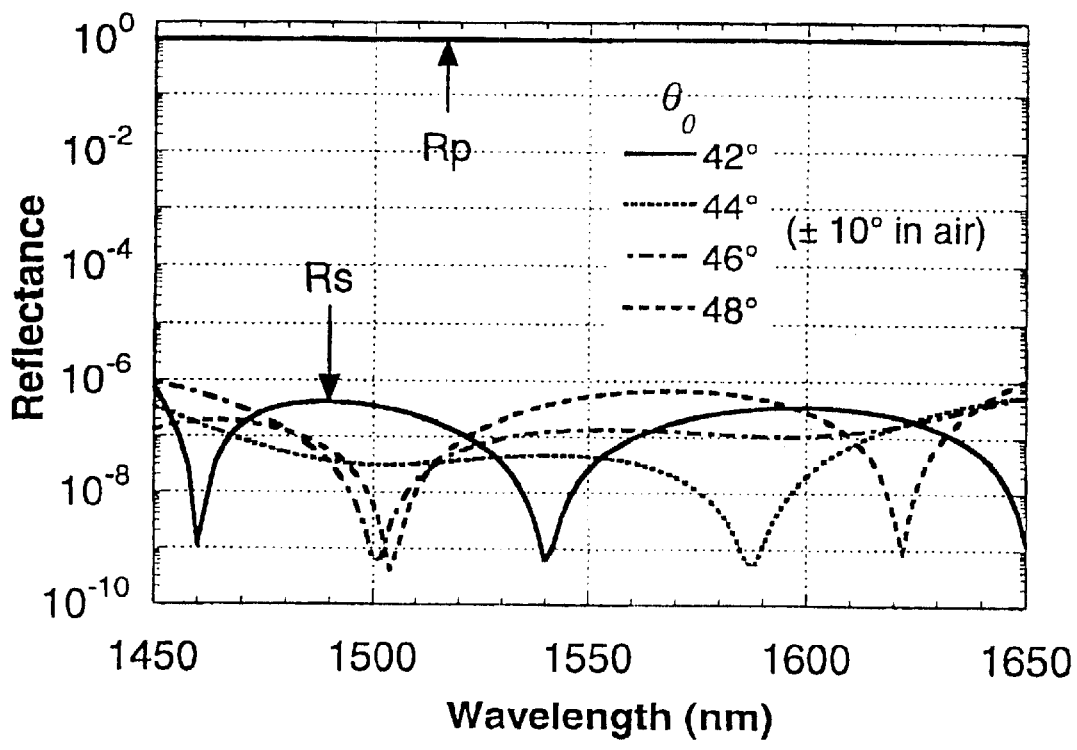
Figure 5A:
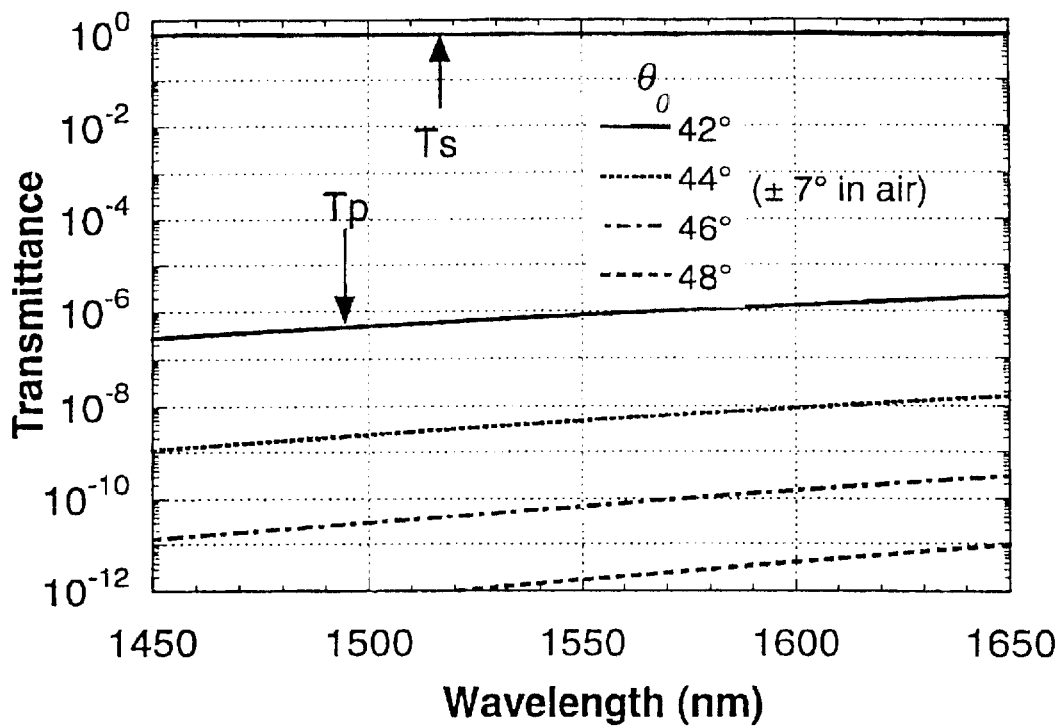
FIGS. 5a and 5b show the calculated transmittance and reflectance of a polarizing beam-splitter coating (PBS-1B) at different angles of incidence for the first PBS embodiment.
Figure 5B:
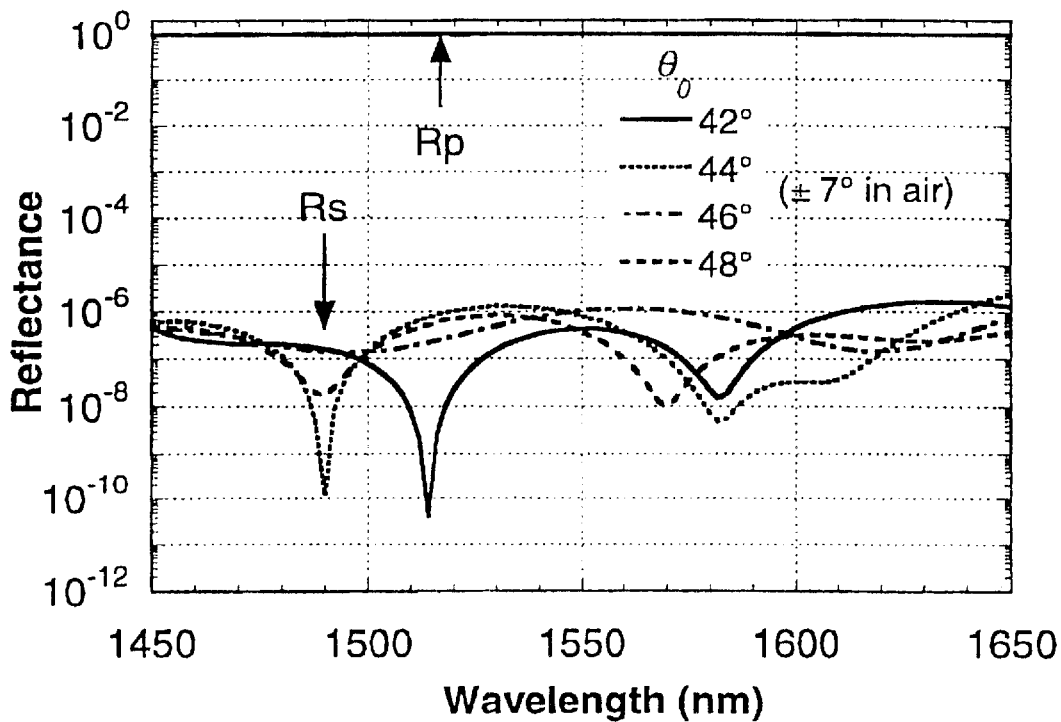

The two thin film PBS coatings PBS-1A and PBS-1B can be used in the first PBS embodiment as shown in FIG. 2 and its variation as shown in FIG. 3. PBS-1A consists of 17 layers of Si and $SiO_2$ materials and is based on a Si substrate. PBS-1B consists of 25 layers of Si and $SiO_2$ materials and is based on a ZnSe substrate. The wavelength region is from 1450 nm to 1650 nm. The angular fields in the prism for both PBS-1A and PBS-1B is 45°±3°, which correspond to ±10° in air for PBS-1A is ±7° in air for PBS-1B respectively. The calculated transmittance and reflectance of PBS-1A at different angles of incidence are plotted in FIGS. 4a and 4b. The calculated transmittance and reflectance of PBS-1B at different angles of incidence are plotted in FIGS. 5a and 5b. Both thin film PBS coatings have similar extinction ratios of $10^6:1$. The undesired polarization is attenuated by more than 60 dB. Clearly, these extinction ratios are much better than those of conventional thin film polarizing devices that could only achieved less than 30 dB attenuation for the undesired polarization. PBS-1A consists of fewer layers than PBS-1B because the refractive index of the Si substrate is higher than that of the ZnSe substrate.

Figure 6:
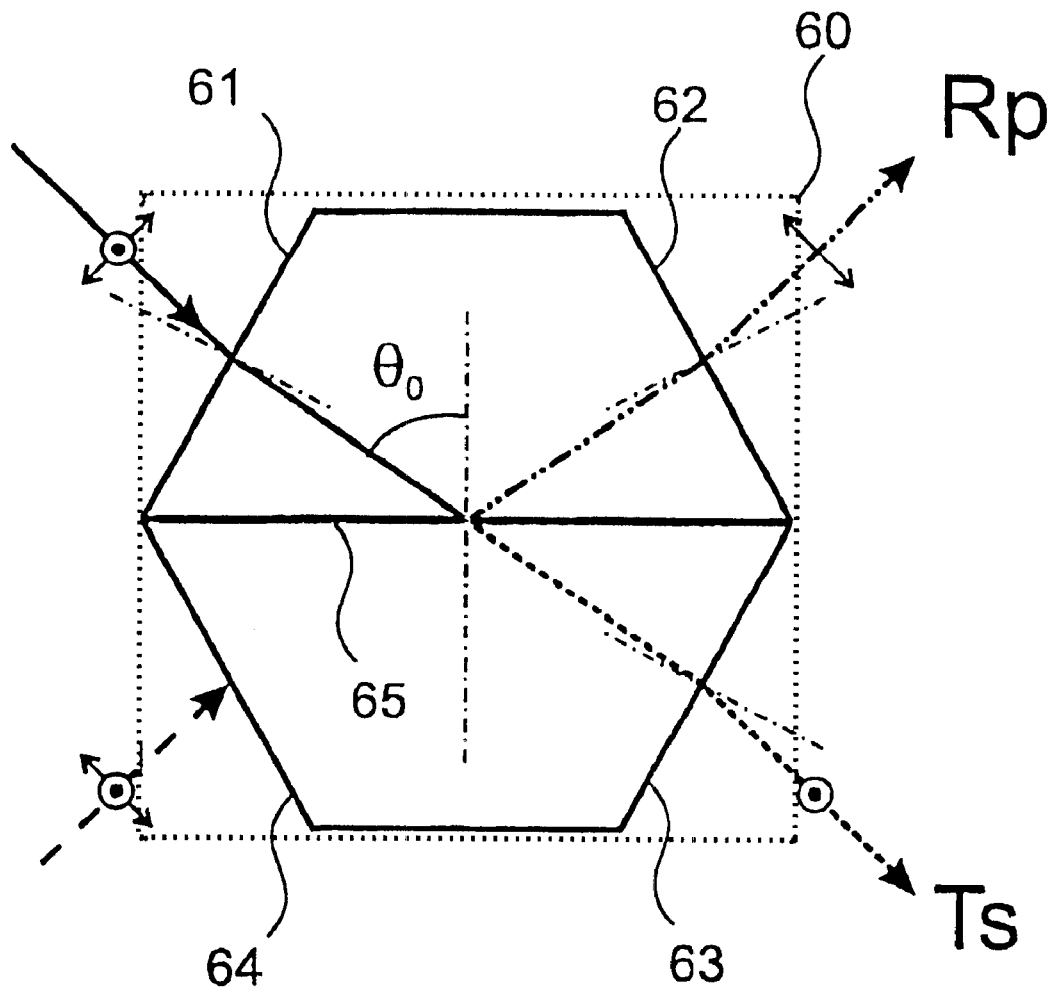
FIG. 6 shows the configuration of the second PBS embodiment.

If a lower refractive index substrate is used, or the design angle $\theta_0$ is increased on purpose in order to simplify the thin film PBS coating, a second PBS embodiment 60 can be used as shown in FIG. 6 and FIG. 19B. This embodiment, which employs a split hexagonal prism, preserves the perpendicular or parallel arrangements for the incident and output beams, but allows the angle of incidence $\theta_0$ greater than 45° at the thin film PBS coating 65 in the prism. This can be done by shaping the angles of the light-accepting surfaces 61, 62, 63, 64, with regard to the plane of the thin film PBS coating. The incident beams or output beams are not normal to the light accepting surfaces anymore, but strike with a small angle of incidence. The four light-accepting surfaces normally have anti-reflection coating in order to remove any reflected light.

Figure 7A:
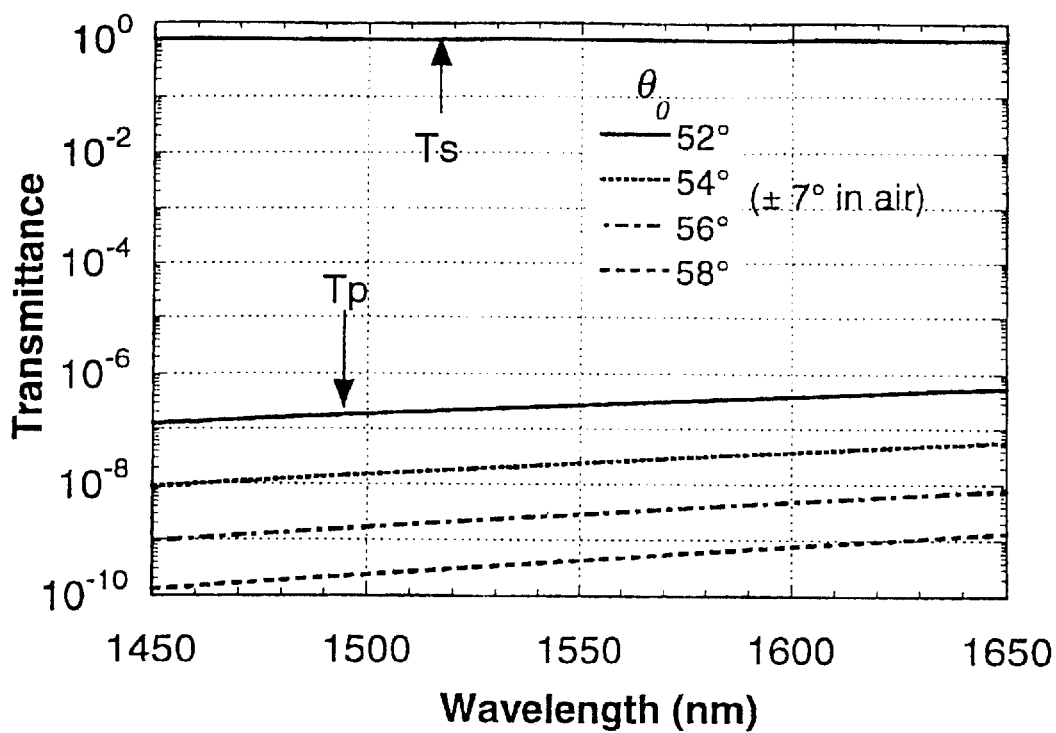
FIGS. 7a and 7b show the calculated transmittance and reflectance of a polarizing beam-splitter coating (PBS-2) at different angles of incidence for the second PBS embodiment.
Figure 7B:
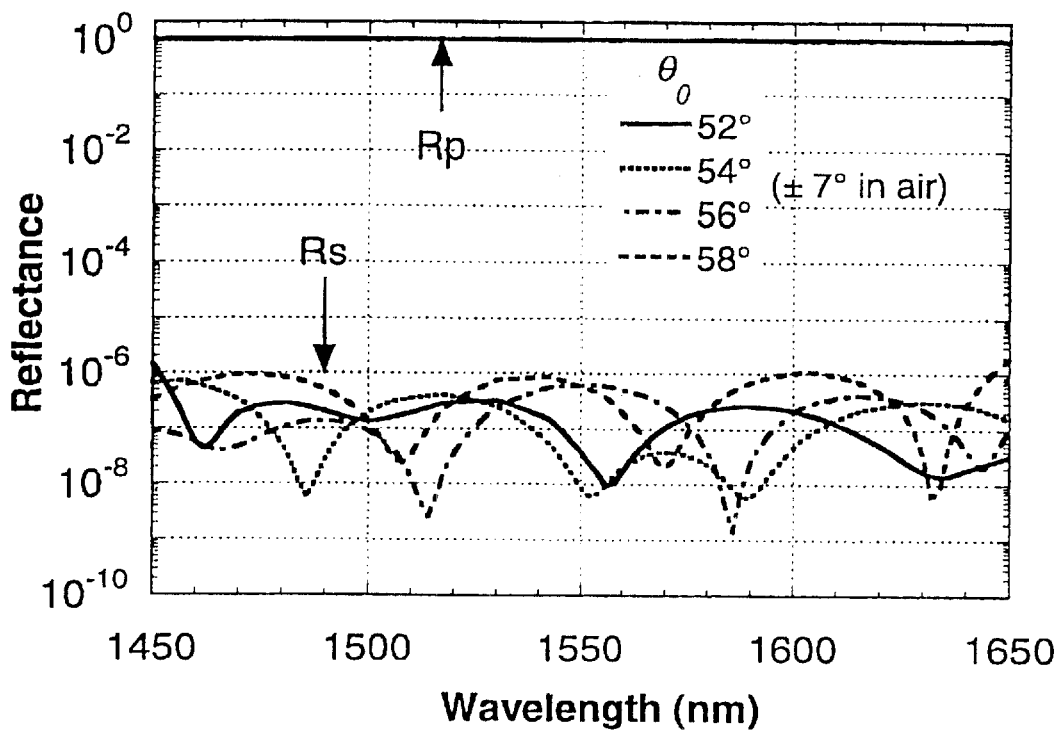

The thin film PBS coating PBS-2 can be used for the second PBS embodiment. The center design angel $\theta_0$ is 55°. PBS-2 consists of 19 layers made of the same coating and substrate materials as PBS-1B (Table 1 below). The calculated transmittance and reflectance at different angles of incidence are plotted in FIGS. 7a and 7b. As it can be seen, the performance of PBS-2 is compatible to PBS 1B. However, PBS-2 consists of only 19 layers, compared to 25 layers in PBS-1B. The total metric thickness is about 2060.3 nm, also less than 3218.1 nm of the PBS-1B. This is beneficial from the manufacturing point of view, because it requires less time to deposit the PBS-2 coating.

TABLE 1

| | Parameters of Thin Film PBS Coatings | | | | | | | | |
|---|---|---|---|---|---|---|---|---|---|
| | PBS-1A | | PBS-1B | | PBS-2 | | PBS-3 | | PBS-4 | |
| No. of Layers | 17 | | 25 | | 19 | | 25 | | 23 | |
| Total Thickness (nm) | 1950.9 | | 3218.1 | | 2060.3 | | 6241.6 | | 5429.5 | |
| Systems | Mat. | Thick (nm) | Mat. | Thick (nm) | Mat. | Thick. (nm) | Mat. | Thick. (nm) | Mat. | Thick (nm) |
| Sub. | Si | — | ZnSe | — | ZnSe | — | F4 | | F4 | |
| | $SiO_2$ | 14.1 | $SiO_2$ | 71.9 | $SiO_2$ | 48.2 | $Nb_2O_5$ | 43.7 | $Nb_2O_5$ | 40.2 |
| | Si | 152.2 | Si | 57.5 | Si | 63.9 | $SiO_2$ | 262.4 | $SiO_2$ | 233.3 |
| | $SiO_2$ | 57.5 | $SiO_2$ | 198.5 | $SiO_2$ | 146.7 | $Nb_2O_5$ | 131.5 | $Nb_2O_5$ | 107.9 |

TABLE 1-continued

Parameters of Thin Film PBS Coatings

| PBS-1A | | PBS-1B | | PBS-2 | | PBS-3 | | PBS-4 | |
|---|---|---|---|---|---|---|---|---|---|
| Si | 145.8 | Si | 58.2 | Si | 88.0 | $SiO_2$ | 419.3 | $SiO_2$ | 263.8 |
| $SiO_2$ | 109.0 | $SiO_2$ | 272.5 | $SiO_2$ | 159.3 | $Nb_2O_5$ | 142.6 | $Nb_2O_5$ | 119.4 |
| Si | 141.6 | Si | 50.4 | Si | 103.5 | $SiO_2$ | 486.5 | $SiO_2$ | 399.7 |
| $SiO_2$ | 140.4 | $SiO_2$ | 268.6 | $SiO_2$ | 140.2 | $Nb_2O_5$ | 130.2 | $Nb_2O_5$ | 160.4 |
| Si | 140.1 | Si | 39.8 | Si | 109.1 | $SiO_2$ | 451.7 | $SiO_2$ | 481.4 |
| $SiO_2$ | 149.9 | $SiO_2$ | 229.6 | $SiO_2$ | 164.2 | $Nb_2O_5$ | 115.7 | $Nb_2O_5$ | 173.7 |
| Si | 140.1 | Si | 38.6 | Si | 93.8 | $SiO_2$ | 459.7 | $SiO_2$ | 408.3 |
| $SiO_2$ | 140.4 | $SiO_2$ | 239.2 | $SiO_2$ | 201.5 | $Nb_2O_5$ | 117.8 | $Nb_2O_5$ | 181.4 |
| Si | 141.6 | Si | 31.9 | Si | 85.7 | $SiO_2$ | 454.5 | $SiO_2$ | 327.6 |
| $SiO_2$ | 108.9 | $SiO_2$ | 167.8 | $SiO_2$ | 194.0 | $Nb_2O_5$ | 112.8 | $Nb_2O_5$ | 174.1 |
| Si | 145.8 | Si | 32.2 | Si | 77.6 | $SiO_2$ | 463.0 | $SiO_2$ | 386.3 |
| $SiO_2$ | 57.5 | $SiO_2$ | 236.9 | $SiO_2$ | 139.8 | $Nb_2O_5$ | 120.1 | $Nb_2O_5$ | 168.8 |
| Si | 152.2 | Si | 38.1 | Si | 58.4 | $SiO_2$ | 473.5 | $SiO_2$ | 471.2 |
| $SiO_2$ | 14.1 | $SiO_2$ | 217.4 | $SiO_2$ | 97.8 | $Nb_2O_5$ | 122.6 | $Nb_2O_5$ | 159.5 |
| | | Si | 39.1 | Si | 48.4 | $SiO_2$ | 458.6 | $SiO_2$ | 400.7 |
| | | $SiO_2$ | 256.6 | $SiO_2$ | 40.1 | $Nb_2O_5$ | 129.3 | $Nb_2O_5$ | 120.4 |
| | | Si | 50.8 | | | $SiO_2$ | 406.5 | $SiO_2$ | 268.2 |
| | | $SiO_2$ | 256.8 | | | $Nb_2O_5$ | 119.8 | $Nb_2O_5$ | 108.6 |
| | | Si | 58.9 | | | $SiO_2$ | 289.2 | $SiO_2$ | 234.1 |
| | | $SiO_2$ | 184.6 | | | $Nb_2O_5$ | 97.8 | $Nb_2O_5$ | 40.2 |
| | | Si | 56.6 | | | $SiO_2$ | 197.7 | | |
| | | $SiO_2$ | 65.7 | | | $Nb_2O_5$ | 35.2 | | |
| Sub. | Si | — | ZnSe | — | ZnSe | — | SF4 | — | SF4 | — |

Figure 8:
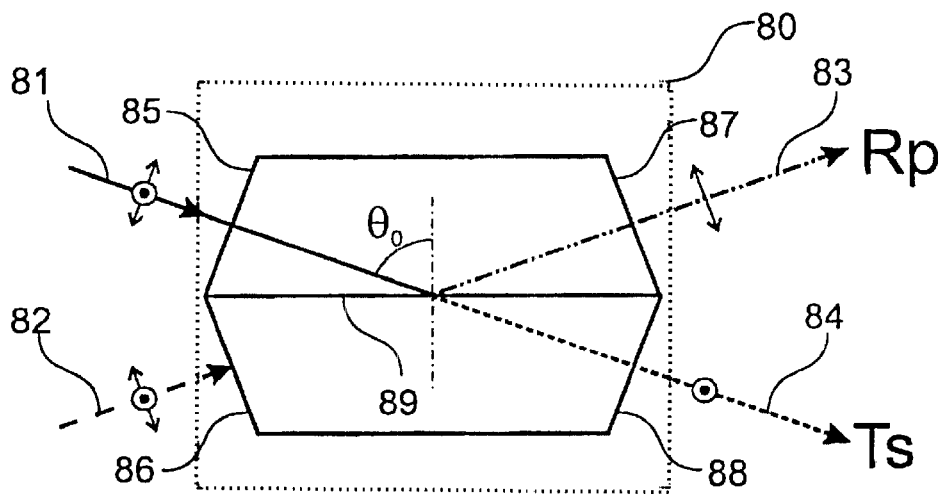
FIG. 8 shows the configuration of the third PBS embodiment.
Figures 19C, 19D:
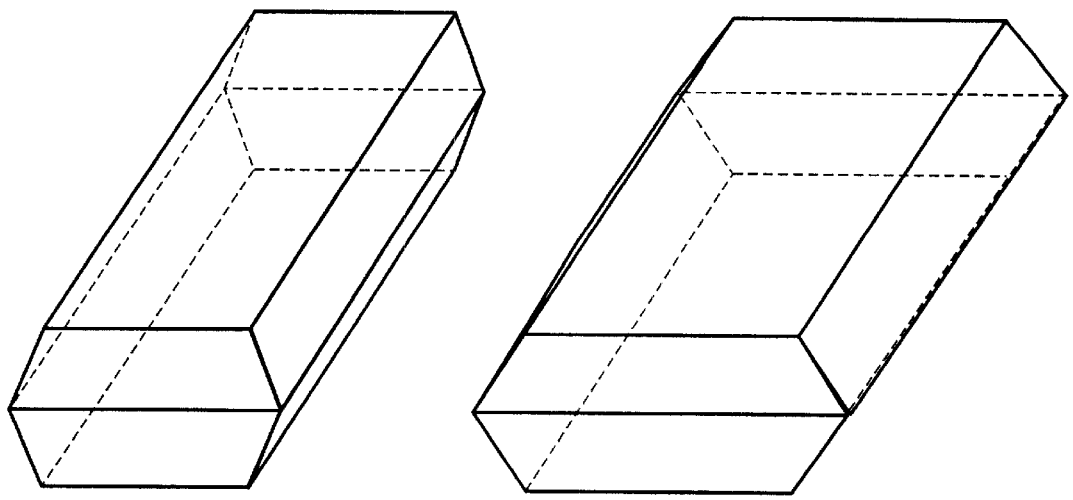

If an even lower refractive index substrate has to be used, or the design angle $\theta_0$ has to be increased on purpose even more in order to simplify the thin film PBS coating, a third PBS embodiment 80 can be used as shown in FIG. 8 and FIG. 19C. It consists of similar elements as the first PBS embodiment. The angle of incidence $\theta_0$ is greater than 45°. The incident beams 81, 82 and the output beams 83, 84 are normal to the light accepting surfaces 85, 86, 87, 88 respectively. This can be done by shaping the angles of the light-accepting surfaces 85, 86, 87, 88 with regard to the plane of the thin film PBS coating 89. The incident beam or output beams are normal to the light accepting surfaces. The four light-accepting surfaces are normally anti-reflection coated in order to remove any reflected light from these surfaces.

Figure 9A:
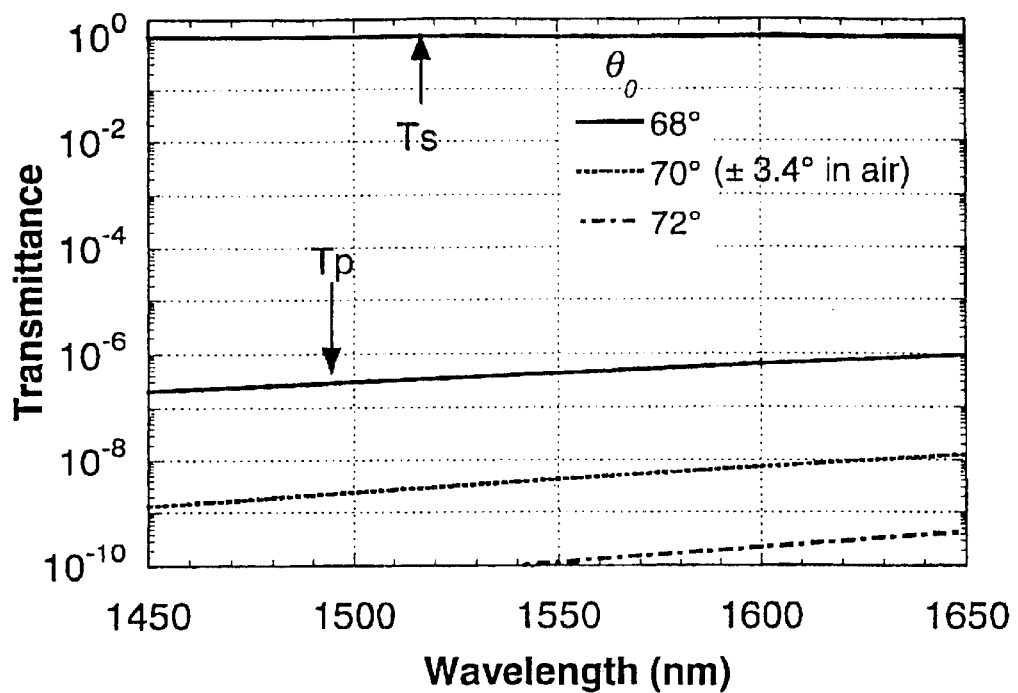
FIGS. 9a and 9b show the calculated transmittance and reflectance of a polarizing beam-splitter coating PBS-3 at different angles of incidence for the third PBS embodiment.
Figure 9B:
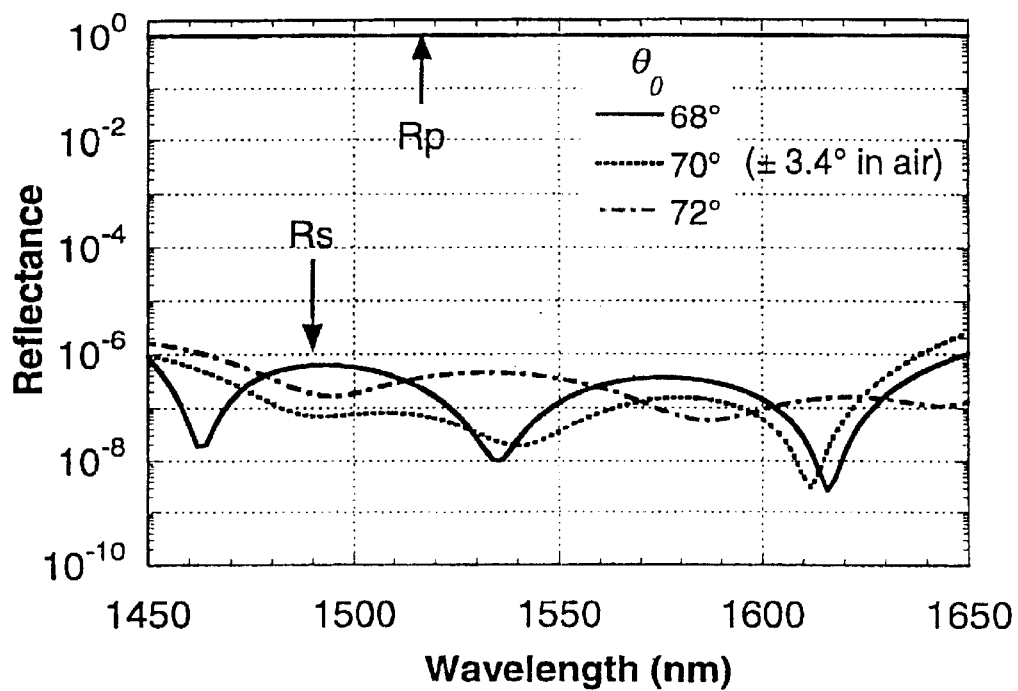

The thin film PBS coating PBS-3 can be used for the third embodiment. The center design angel $\theta_0$ is 70°. PBS-3 consists of 25 layers of $SiO_2$ and $Nb_2O_5$ materials and is based on the $SF_4$ glass substrate (Table 1). The calculated transmittance and reflectance of PBS-3 are plotted in FIGS. 9a and 9b. The extinction ratio is about $10^6$:1 for most angles of incidence. This is compatible to the above thin film PBS coatings. However, because the refractive indices of the substrate and the high index materials are lower, the angular field of PBS-3 is about 70°±2° in prism and ±3.4° in air, smaller than the above thin film PBS coatings. However, compared to conventional thin film polarizing devices, this angular field is still much better.

Figure 10:
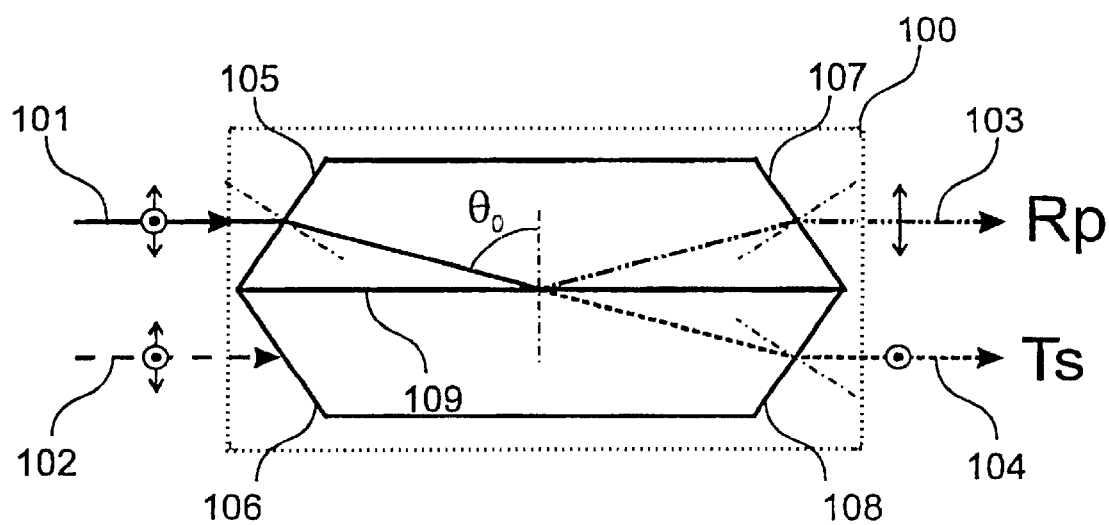
FIG. 10 shows the configuration of the fourth PBS embodiment.

For some optical device embodiments in accordance with the present invention, it is desirable to have the incident beams and output beams parallel to each other. This can be realized in the fourth PBS embodiment 100 as shown in FIG. 10 and FIG. 19D. The embodiment consists of similar elements as the first PBS embodiment. The angle of incidence $\theta_0$ at the thin film PBS coating 109 is much greater than 45°. The incident beams 101, 102 and the output beams 103, 104 are incident upon the light accepting surfaces 105, 106, 107 and 108 at an angle. This angle will result in the incident beams inside the prism meet the requirements for the thin film PBS coating design. The four light-accepting surfaces are anti-reflection coated in order to remove any reflected light from these surfaces.

Figure 11A:
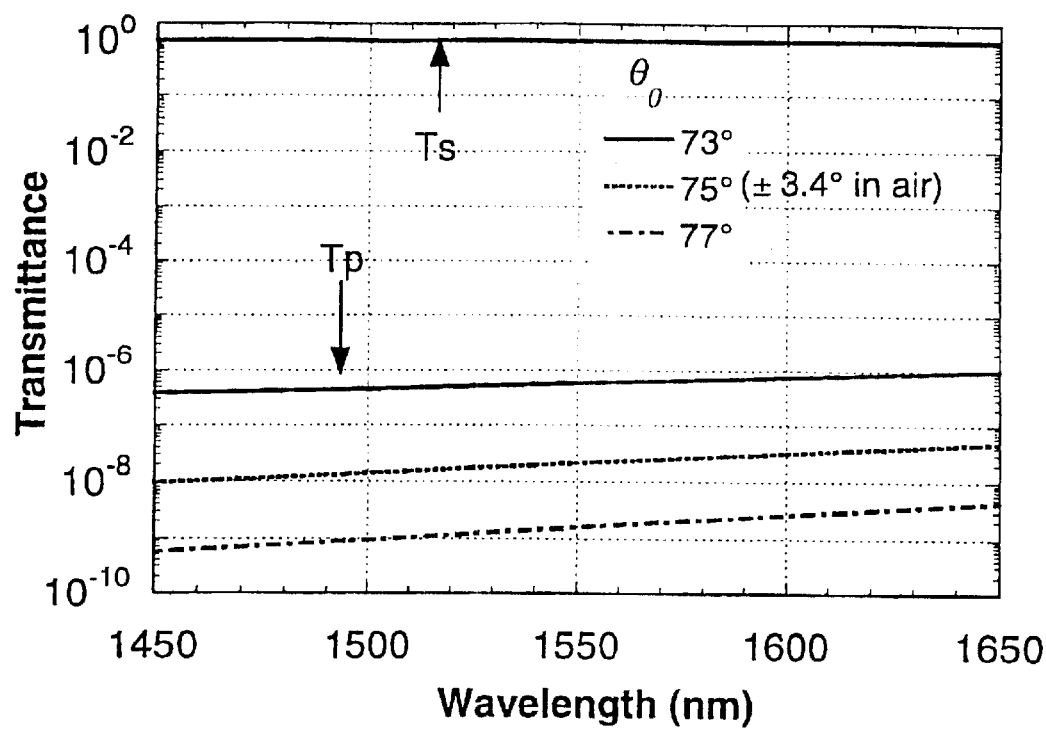
FIGS. 11a and 11b show the calculated transmittance and reflectance of a polarizing beam-splitter coating PBS-4 at different angles of incidence for the fourth PBS embodiment.
Figure 11B:
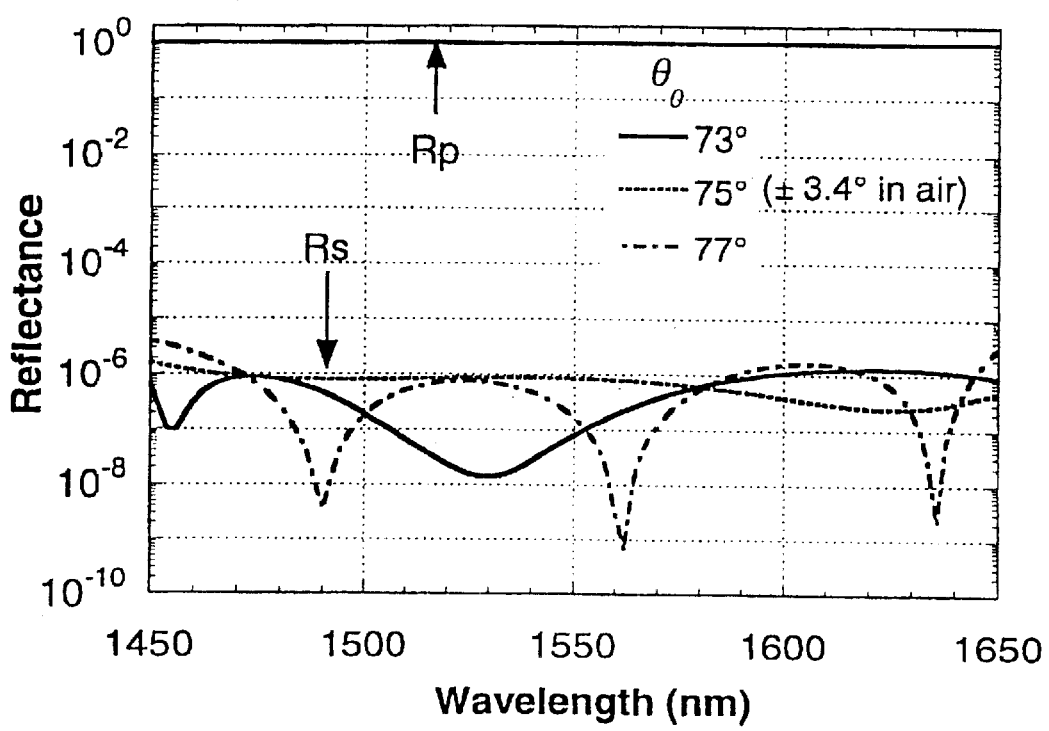

The thin film PBS coating PBS-4 can be used for the fourth embodiment. The center design angel $\theta_0$ is 75°. PBS-4 consists of 23 layers of $SiO_2$ and $Nb_2O_5$ materials and is based on the SF4 glass substrate (Table 1). The calculated transmittance and reflectance of PBS-4 are plotted in FIGS. 11a and 11b. The extinction ratio is about $10^6$:1 for most angles of incidence. This is compatible to the above thin film PBS coating PBS-3. The angular field is about 75°±2° in prism and ±3.4° in air.

Clearly, without departure from the spirit of the invention, other thin film polarizing device embodiments having different wavelength bandwidths, angular fields, extinction ratios, as well as using different coating and substrate materials can be designed. This has been fully demonstrated in the U.S. patent application Ser. No. 08/694,415 filed on Aug. 12, 1996 by Li Li and J. A. Dobrowolski.

Embodiments of Optical Devices

The embodiments of the optical device, such as an optical switch, optical isolator or optical circulator in accordance with the present invention comprises of at least one thin film polarizing device of the type described in the above section and at least a polarization-rotating device.

Figure 12:
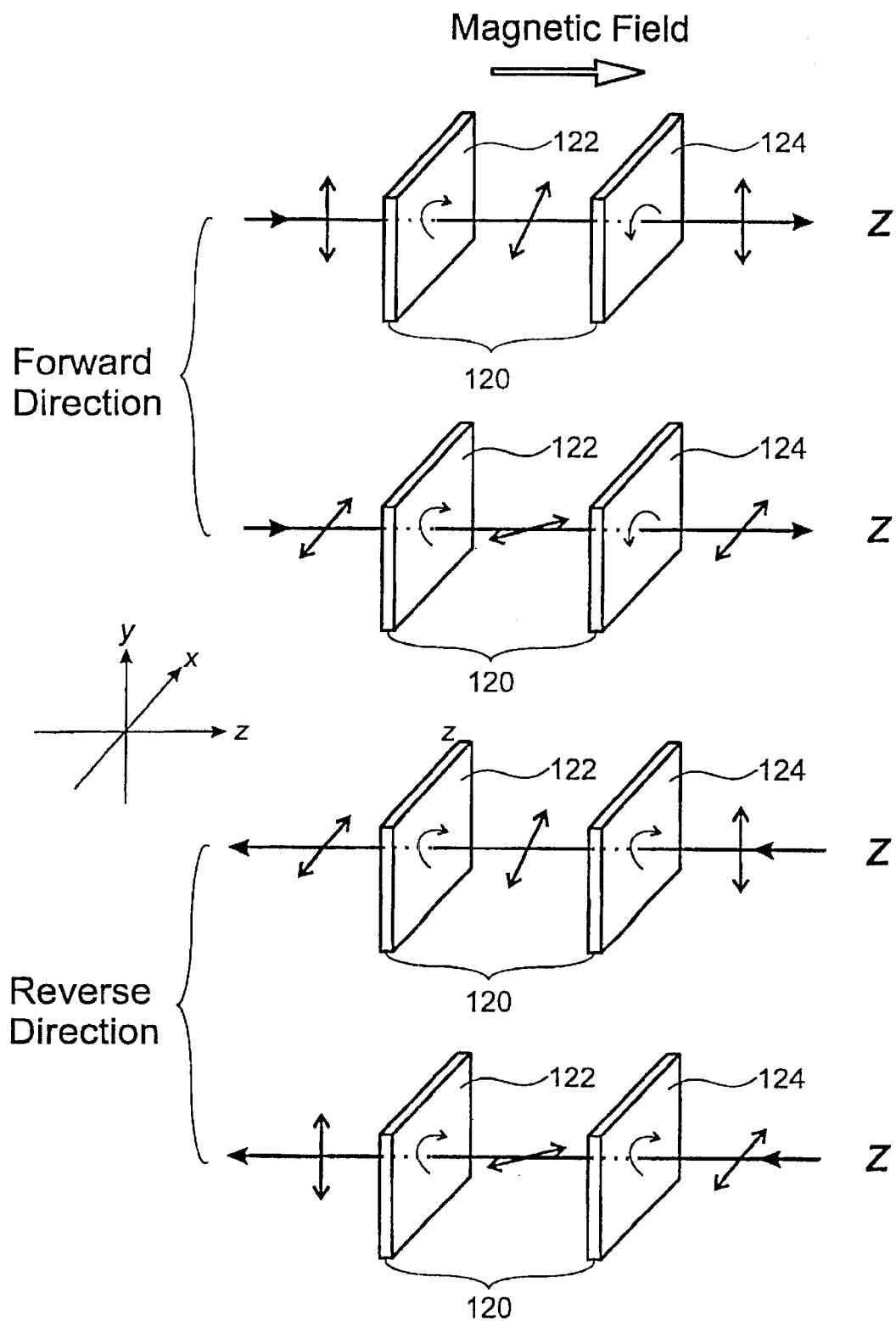
FIG. 12 illustrates the principle of operation of a polarization-rotating device used in an optical device in accordance with the present invention.

The polarization-rotating device 120 consists of a reciprocal device such as a Faraday rotator 122 and a halfwave plate 124 (FIG. 12). A magnetic field is applied to the Faraday rotator in the z-direction. This can be achieved by using a permanent magnet or an electric coil with electric current passing through. When the light polarized in the y-direction travels in the forward direction (z-direction), the Faraday rotator rotates the polarization of this linear polarized light by 45° in the counter-clockwise direction if looking into the z-direction. When the rotated polarized light passes through the halfwave plate 124, its plane of polarization is rotated 45° in the opposite direction with regard to the first rotation by the Faraday rotator. Therefore, the polarization rotation is completely cancelled out and the light comes out from the polarization-rotating device with its polarization unchanged in the y-direction. For light linearly polarized in the x-direction, it also keeps its polarization state unchanged after passing through the polarization-rotating device in the forward direction. However, when linear polarized light travels in the reverse direction, the polarization rotations by the halfwave plate 124 and by the Faraday rotator 122 are in the same direction; as a result, linear polarized light in y-direction becomes linear polarized in x-direction and linear polarized light in x-direction becomes linear polarized light in y-direction. This non-reciprocal effect is extensively used in optical isolators and circulators.

If the magnetic field is reversed in the opposite direction, the polarization rotation will be reversed as well for light travel in the forward and reverse directions. In other words, the polarization of a linear polarized light will be rotated by 90° in the forward direction and 0° in the reverse direction.

Figure 13A:
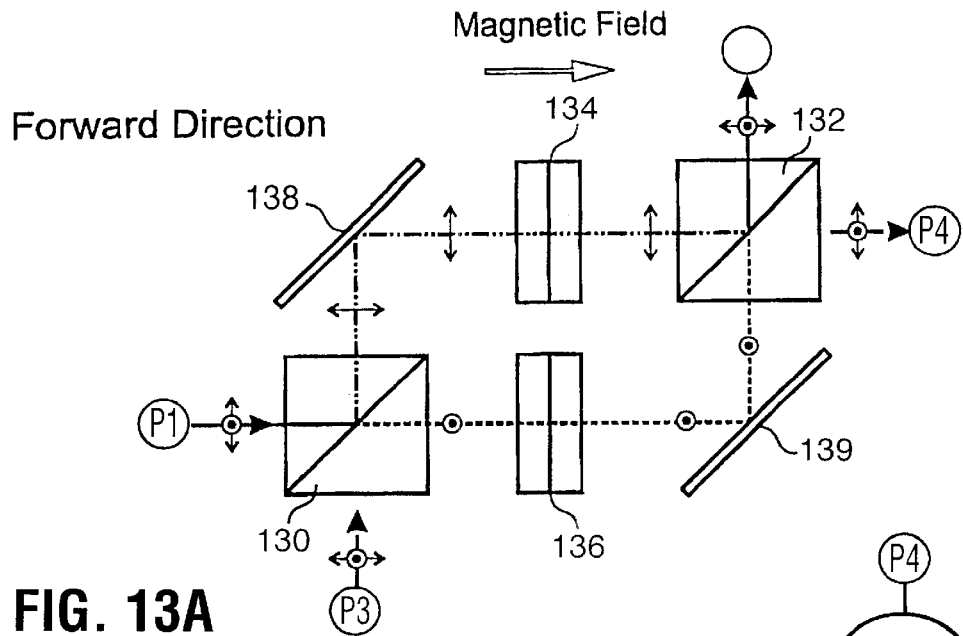
FIGS. 13a and 13b are cross sectional views.
Figure 13C:
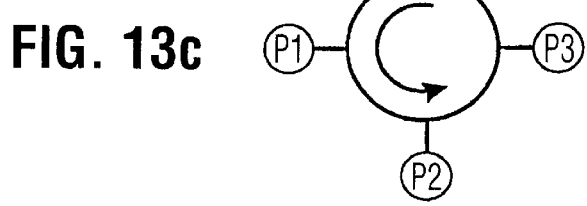
FIG. 13c is a schematic diagram showing the working principle, of an optical device in accordance with a first embodiment of the invention.
Figure 13B:
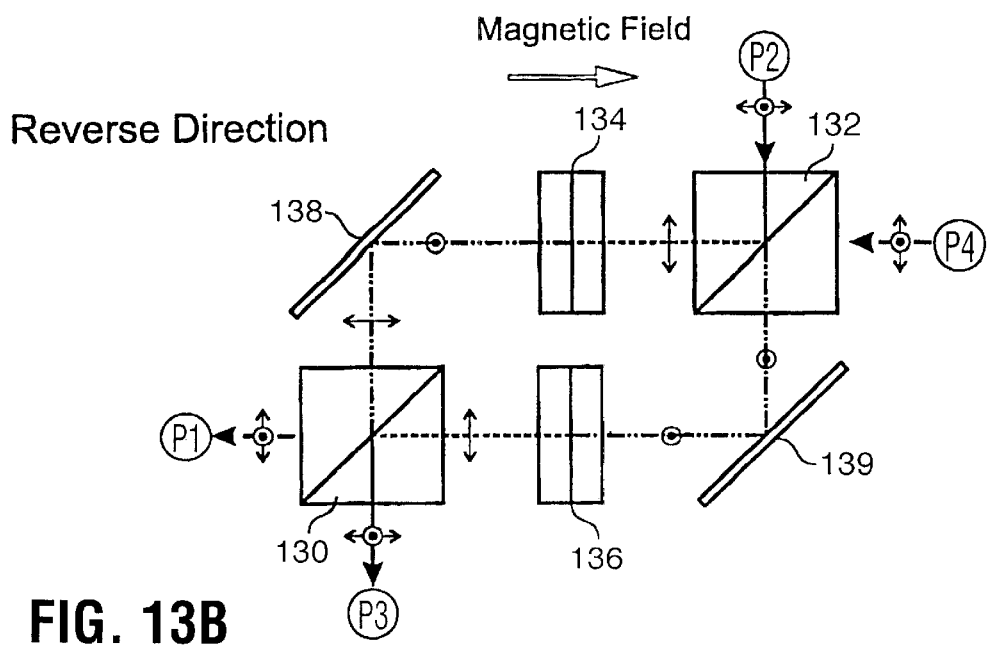

The first embodiment of the optical device in accordance with the present invention is shown in FIGS. 13a to 13c. It consists of two polarizing devices 130 and 132 such as the first PBS embodiment, two polarization-rotating devices 134, 136 and two mirrors 138, 139. It has four ports P1, P2, P3, P4 and four light beams can be incident or exit from these ports. For an unpolarized light beam incident at port P1, the p-polarized light is first reflected by the polarizing device 130 and then by the mirror 138. After passing through the polarization-rotating device 134, its polarization is unchanged and therefore it is reflected by the second polarizing device 132 and exits from the port P2. For the s-polarized light, it is first transmitted by the first polarizing device 130 and then passes through the polarization-rotating device 136 with its polarization unchanged and then is reflected by the mirror 139 towards the second polarizing device 132. Therefore, it is transmitted by the polarizing device and exits from port P2. As a result, all incident light at port P1 goes to port P2 independent of the polarization. Unpolarized light incident at port P3 will go through similar routes and come out from port P4.

If the magnetic filed is reversed electronically (for example if an electric coil is used to generate the magnetic field, this can be easily done by reversing the current direction), the polarization rotations by the halfwave plate and Faraday rotator will be accumulated in the forward direction and be cancelled out in the reverse direction. As a result, the unpolarized light from port P1 can come out from either port P2 or port P4 depending on the direction of the magnetic field. Therefore this optical device can be used as an optical switch. This mode of operation is present in all optical device embodiments in accordance with the present invention. It will not be explicitly mentioned again as it has been clearly demonstrated here.

When a polarized light travels in the reverse direction from port P2, the p-polarized light is first reflected by the polarizing device 132 and then its polarization is rotated by 90° by the polarization-rotating device 134. As a result, it becomes s-polarized light and is transmitted by the polarizing device 130 and exits from port 3. The s-polarized light from port P2 becomes p-polarized light after passes through the polarization-rotating device 136 and is reflected by the polarizing device 130 and eventually exits from port P3. Therefore, all light from port P2 goes to port P3, similarly, all light from port P4 goes to port P1. As a result, this optical device circulates optical signals from port P1 to port P2, port P2 to port P3 and port P3 to port P4 and port P4 to port P1 as shown in FIG. 13c. It is, therefore, an optical circulator.

If port P3 and port P4 are not connected to any optical signals, the device can be used as an optical isolator. Light can travel in the forward direction from port P1 to port P2. However, any light from port P2 is directed to port P3 which is physically isolated from port P1. This mode of operation is present in all optical device embodiments in accordance with the present invention and therefore will not be explicitly mentioned again as it has been demonstrated here.

Figure 14A:
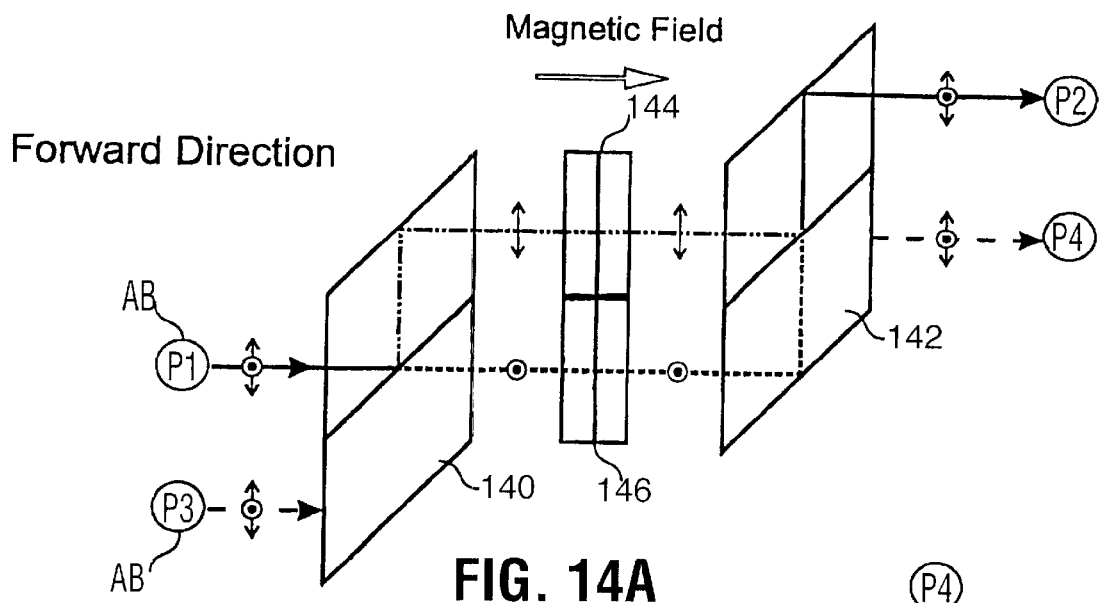
FIGS. 14a and 14b are cross sectional views.
Figure 14C:
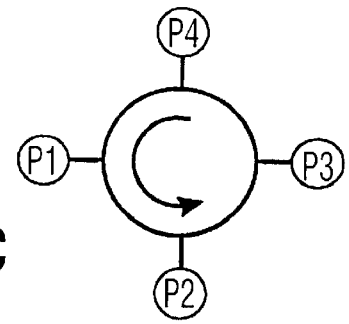
FIG. 14c is a schematic diagram showing the working principle, of the second embodiment of an optical device in accordance with the principles of the present invention.
Figure 14B:
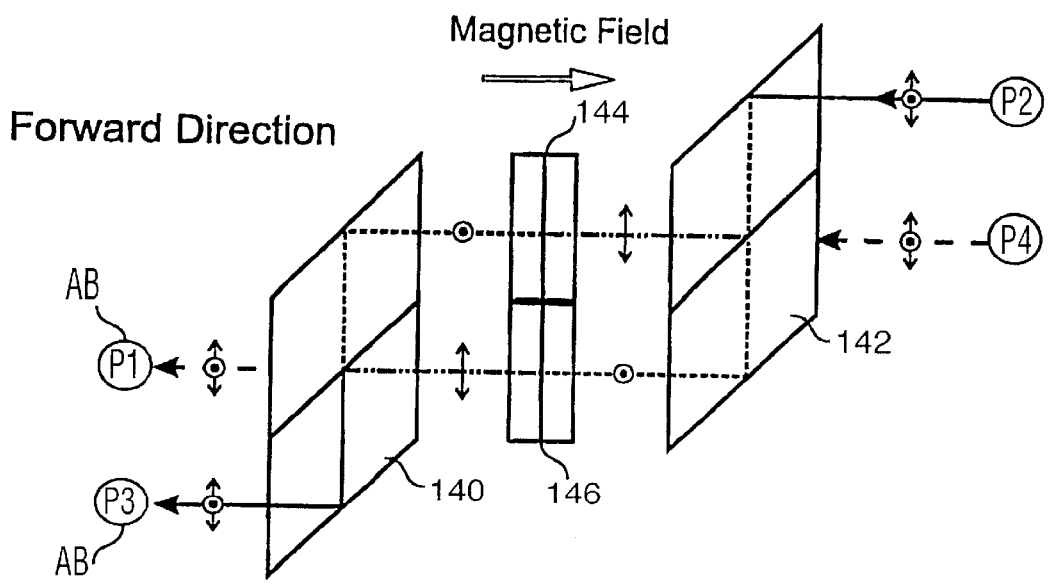

The second embodiment of the optical device in accordance with the present invention is shown in FIGS. 14a to 14c. The working principle of this embodiment is exactly the same as the first optical device embodiment. However, it uses two polarizing devices 140 and 142 similar to the PBS embodiment 48 shown in FIGS. 3 and 19AA, which is the variation of the first PBS embodiment 30. One advantage of such PBS embodiment is that it simplifies the structure of the optical device by combining the polarizing device with a mirror. Another advantage is that all incident beams and output beams are parallel to each other which is desirable in some applications. Like the first embodiment of the optical device, two polarization-rotating devices 144, 146, consisting of a Faraday rotator and a halfwave plate are inserted in each polarized beam, respectively.

Figure 15A:
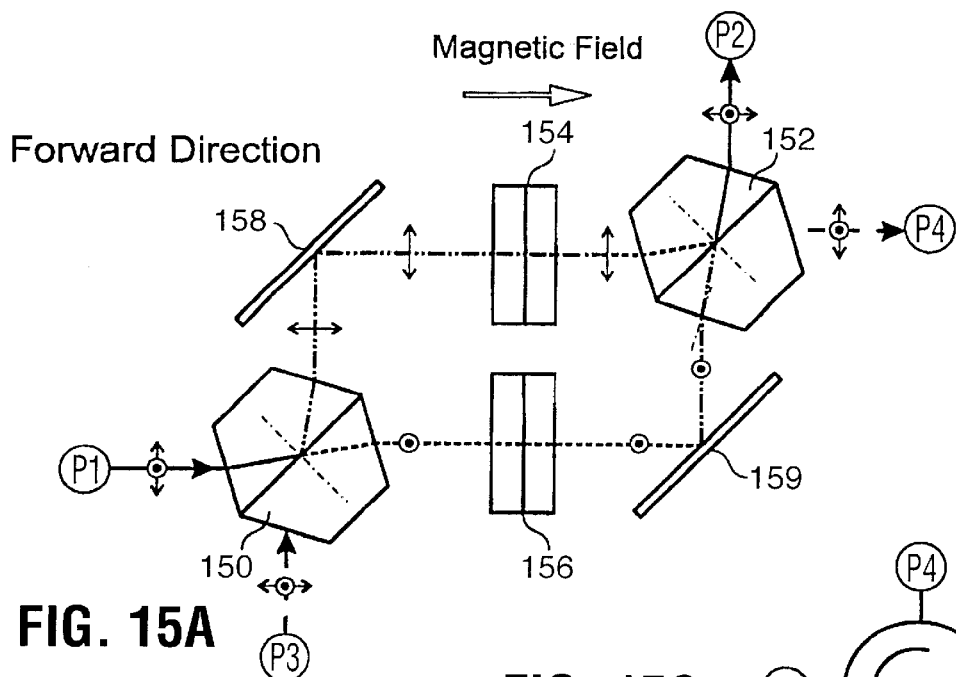
FIGS. 15a and 15b are cross sectional views.
Figure 15C:
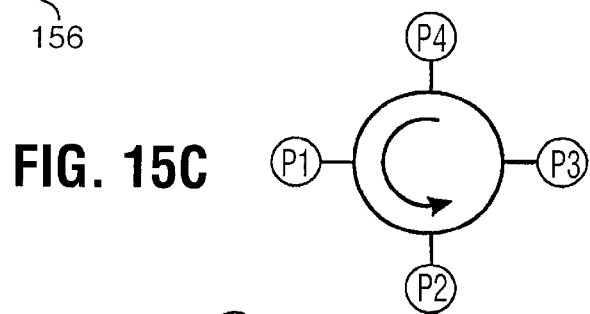
FIG. 15c is a schematic diagram showing the working principle, of the third embodiment of an optical device in accordance with the principles of the present invention.
Figure 15B:
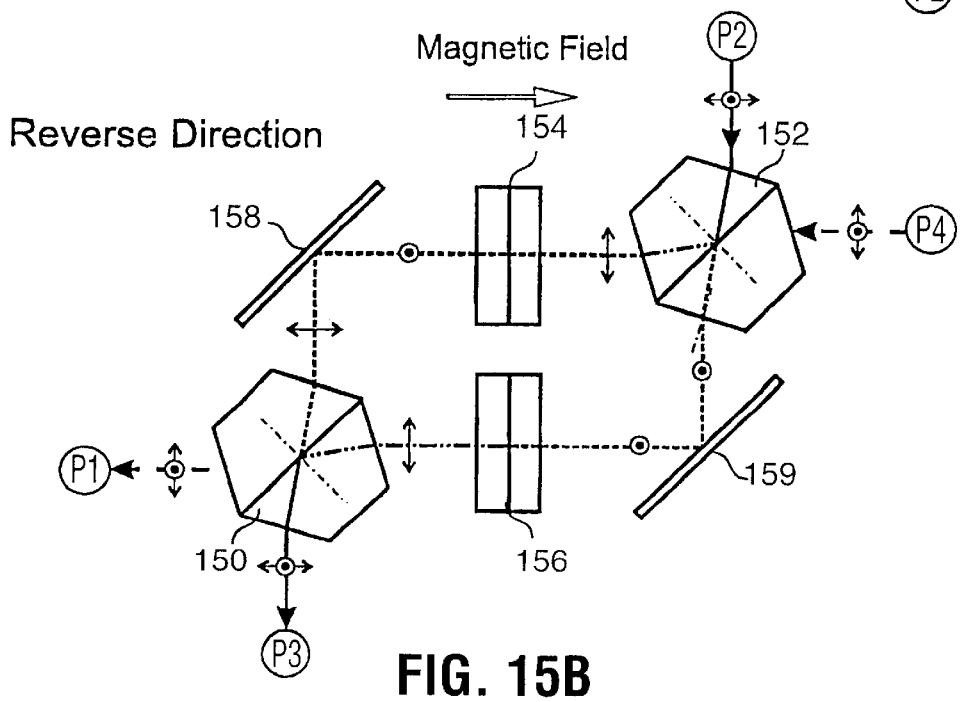

The third embodiment of the optical device in accordance with the present invention is shown in FIGS. 15a to 15c. It is similar to the first optical device embodiment. It consists of two thin film polarizing devices 150, 152, two mirrors, 158, 159 and two polarization-rotating devices 154, 156. The incident beams and output beams are either perpendicular to or parallel to each other. The two polarizing devices 150, 152 are similar to the second PBS embodiment 60 shown in FIGS. 6 and 19B in which the incident angle in the prism is larger than 45°.

Figure 16A:
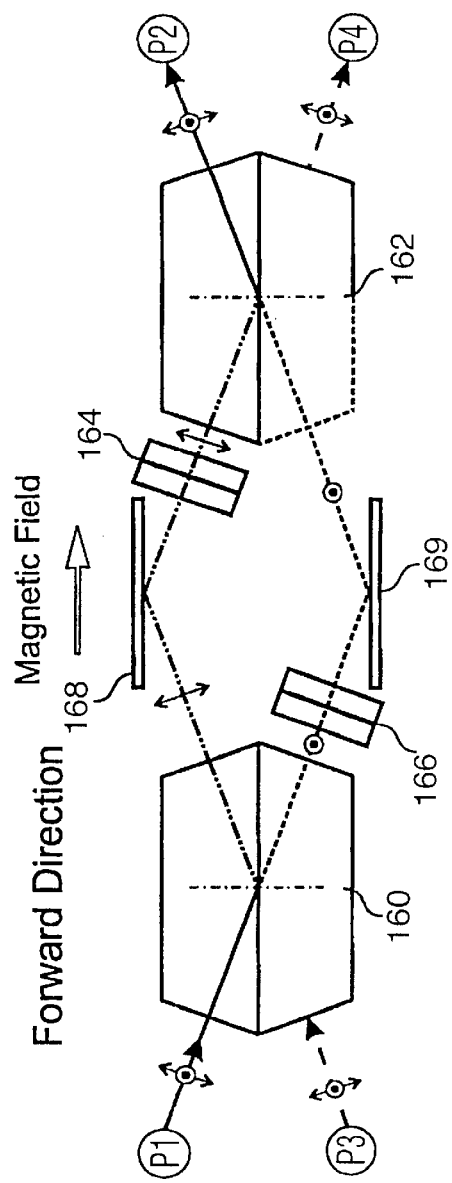
FIGS. 16a and 16b are cross sectional views.
Figure 16C:
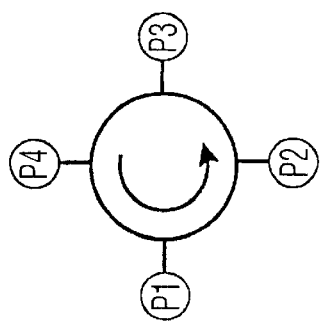
FIG. 16c is a schematic diagram showing the working principle, of the fourth embodiment of an optical device in accordance with the principles of the present invention.
Figure 16B:
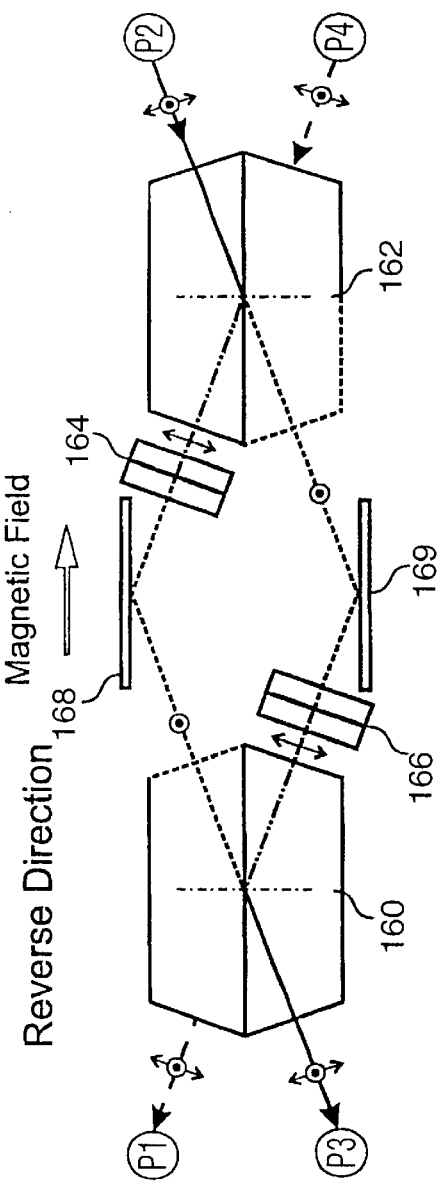

The fourth embodiment of the optical device in accordance with the present invention is shown in FIGS. 16a to 16c. It consists of two thin film polarizing devices 160, 162, two mirrors, 168, 169 and two polarization-rotating devices 164, 166. It is also similar to the first optical device embodiment. However, the angle of incidence in the prism is larger than 45° and it uses the third PBS embodiment 80 shown in FIGS. 8 and 19C. In addition, the incident beams and output beams are not perpendicular or parallel to each other.

The fifth embodiment of the optical device in accordance with the present invention is shown in FIGS. 17a to 17c. It consists of two thin film polarizing devices 170, 172, and a single polarization-rotating device 174. It is similar to the second optical device embodiment. The incident beams and output beams are parallel to each other. However, it uses the fourth PBS embodiment 100 shown in FIGS. 10 and 19D in which the angle of incidence in the prism is larger than 45°.

All the above optical device embodiments can be configured as a polarization-independent optical switch, optical isolator or optical circulator. Since the optical path for both s- and p-polarized light is the same, there is no polarization dispersion. Compared to the optical devices based on the conventional thin film polarizing devices, the present invention has much higher extinction ratio ($10^6$:1) and wider angular field. Their high isolation is compatible to those optical devices based on the birefringent materials. Their wider angular field allows a less strict beam alignment. In addition, the polarizing devices in accordance with the present invention is based on the effects of frustrated total internal reflection and thin film interference, the thin film PBSs do not introduce polarization mode dispersion. Compared to the conventional optical devices based on the birefringent materials, the performance of the optical device in accordance with the present invention is compatible. However, it is much easier to be produced and less expensive. For example, long pieces of the PBSs can be easily made as shown in FIGS. 19A, 19AA, 19B, 19C and 19D which can be used to form multiple 4×N devices in the z-direction. With the birefringent materials, this can be very expensive and difficult to be realized. Most importantly, the thin film PBSs are very flexible, they can use different coating and substrate materials, and can be designed to meet different performance requirements, for example, for different spectral regions or angular fields, they can also be made in larger or smaller pieces.

Figure 18:
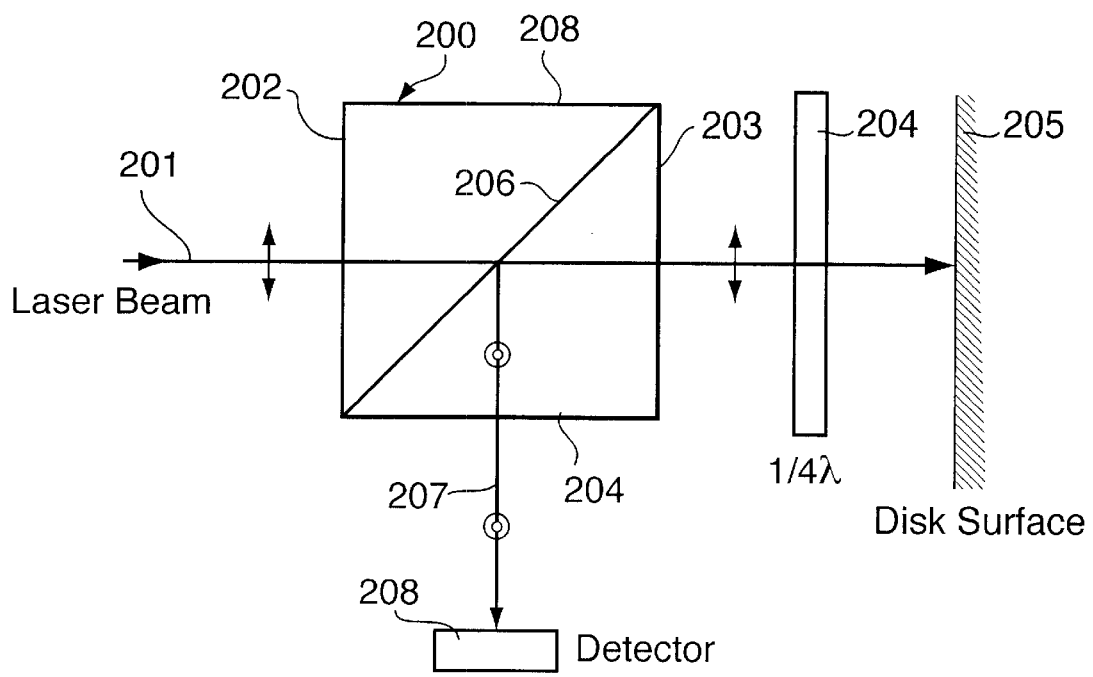
FIG. 18a and 18b shows the configuration of a polarization isolator using a single polarizing device.

FIGS. 18a and 18b shows an embodiment of an optical isolator for use with polarized light, which consists of a PBS 200 of the type shown in FIGS. 2 and 19A. In FIG. 18a, an s-polarized incident laser beam 201 strikes face 202 defining an input port and passes through the thin film polarizing coating 206 to exit from face 203. The s-polarized beam emerging from face 203 passes through quarterwave plate 204, where it undergoes a rotation of 45° before striking mirror 205 and being reflected back along the incident direction. After passing through quarterwave plate 204 a second time, it undergoes a further 45° rotation so as to become p-polarized before re-entering the PBS 200 through face 203. Since the re-entering beam is now p-polarized it is reflected at the thin film coating to finally emerge as a p-polarized beam 207 before striking the detector 208. The device shown in FIG. 18a functions as a polarization-dependent optical isolator because any light returned from the mirror 205 will be reflected at coating 206 and egress through surface 204. Being p-polarized, it will not be transmitted through the coating 206 to the input port. In FIG. 18b, the incident laser beam 201 is p-polarized, it is first reflected by the thin film polarizing coating 206 and then goes through a similar process as shown in FIG. 18a and strikes the detector as s-polarized light.

Of course, if the incident laser light is p-polarized as shown in FIG. 18b, the mirror 205, providing a reflecting surface, would be placed above face 209. The reflected beam would become s-polarized and thus emerge through face 204 as in the embodiment shown in FIG. 18b.

Without departing from the spirit of the invention, other PBS embodiments and optical device embodiments using these PBS embodiments can be designed. For example, the thin film polarizing device embodiments disclosed in U.S. patent application Ser. No. 08/694,415, can be used to form broadband optical switches, isolators and circulators in the present invention. For use as an optical isolator, the half-wave plate can be removed and the second polarizing device can be aligned 45° with regard to the first polarizing device. Other optical device embodiments using double stages in a multi-port optical device can also be realized in the present invention.

I claim:

1. In an optical device for controlling a flow of light between ports and comprising a pair of polarizing devices, the improvement wherein said polarizing devices each comprise a stack of alternate high and low refractive index thin film layers sandwiched between two high refractive index substrates and employ frustrated total internal reflection and interference, the thicknesses of the thin film layers being such that an equivalent optical admittance of the film layers for s-polarized light is substantially the same as an optical admittance of the substrates for s-polarized light for a range of angles of incidence and a band of wavelengths when incident light is incident upon the low refractive index layers at an angle greater then the critical angle whereby substantially all the s-polarized light is transmitted, and the thin film layers having an equivalent optical admittance for p-polarized light that is substantially different from the optical admittance of the substrates for p-polarized light for a range of angles of incidence and a band of wavelengths, whereby substantially all the p-polarized light is reflected.

2. An optical device as claimed in claim 1, wherein in a first direction a first of said pair of polarizing devices splits a light beam incident at a first port into a reflected p-polarized beam and a transmitted s-polarized beam, and a second of said polarizing devices combines a p-polarized beam and a s-polarized beam into a combined unpolarized output beam at a second port.

3. An optical device as claimed in claim 2, further comprising a polarization-rotating device in each of said p-polarized and s-polarized beams.

4. An optical device as claimed in claim 3, wherein said polarization-rotating device is a non-reciprocal device affecting beams travelling in opposite directions differently.

5. An optical device as claimed in claim 4, wherein each said polarization-rotating device is operable to pass light therethrough in a forward direction unaffected and pass light therethrough in a reverse direction with its plane of polarization changed, whereby light travelling in said reverse direction is combined by said first polarizing device into an unpolarized beam exiting said first polarizing device at a further port different from said first port and physically isolated therefrom such that said optical device functions as an optical isolator.

6. An optical device as claimed in claim 5, wherein said pair of polarizing devices each comprise a rectangular prism split along a diagonal to accommodate said thin film layers, and mirrors are provided to redirect said split beams into a parallel arrangement.

7. An optical device as claimed in claim 5, wherein said polarizing devices each comprise a rhomboidal prism split along a median plane to accommodate said thin film layers, said prisms providing a back surface to redirect said split beams into a parallel arrangement.

8. An optical device as claimed in claim 5, wherein said polarizing devices each comprise a regular hexagonal prism split along a median plane to accommodate said thin film layers, and mirrors are provided to redirect said split beams into a parallel arrangement.

9. An optical device as claimed in claim 5, wherein said polarizing devices each comprise an irregular hexagonal prism split along a median plane to accommodate said thin film layers, said s-polarized and p-polarized beams exit said first polarizing device at an angle, and mirrors are provided to redirect said split beams at an angle into respective faces of said second polarizing device.

10. An optical device as claimed in claim 5, wherein said polarizing devices each comprise an irregular hexagonal prism split along a median plane to accommodate said thin film layers, and the angles of faces of said polarizing devices are selected such that said s-polarized and p-polarized beams exit said first polarizing device in parallel and enter said second polarizing device in parallel.

11. An optical device as claimed in claim 4, wherein said polarizing device additionally has a third port and said second polarizing device additionally has a fourth port, and each said polarization-rotating device is operable to pass light therethrough in a forward direction unaffected and pass light therethrough in a reverse direction with its plane of polarization changed, whereby light travelling in said reverse direction from said second port is combined by said first polarizing device into an unpolarized beam exiting said first polarizing device at said third port, light travelling in said reverse direction from said fourth port is combined by said first polarizing device into an unpolarized beam exiting said first polarizing device at said first port, and so on such that said optical device can function as an optical circulator.

12. An optical device as claimed in claim 11, wherein each of said pair of polarizing devices comprise a rectangular prism split along a diagonal to accommodate said thin film layers, and mirrors are provided to redirect said split beams into a parallel arrangement.

13. An optical device as claimed in claim 11, wherein said polarizing devices each comprise a rhomboidal prism split along a median plane to accommodate said thin film layers, said prisms providing a back surface to redirect said split beams into a parallel arrangement.

14. An optical device as claimed in claim 11, wherein said polarizing devices each comprise a regular hexagonal prism split along a median plane to accommodate said thin film layers, and mirrors are provided to redirect said split beams into a parallel arrangement.

15. An optical device as claimed in claim 11, wherein said polarizing devices each comprise an irregular hexagonal prism split along a median plane to accommodate said thin film layers said s-polarized and p-polarized beams exit said first polarizing device at an angle, and mirrors are provided to redirect said split beams at an angle into said respective faces of said second polarizing device.

16. An optical device as claimed in claim 11, wherein said polarizing devices each comprise an irregular hexagonal prism split along a median plane to accommodate said thin film layers, and the angles of faces of said polarizing devices are selected such that said s-polarized and p-polarized beams exit said first polarizing device in parallel and enter said second polarizing device in parallel.

17. An optical device as claimed in claim 3, wherein said polarization-rotating device is a Faraday rotator associated with a waveplate.

18. An optical device as claimed in claim 3, wherein said polarization-rotating device is selectively operative according to its rotational state to change the plane of polarization of light passing therethrough, whereby the second polarizing device outputs said combined unpolarized output beam at said second port or a further port depending on the rotational state of said polarization-rotating device such that said optical device functions as an optical switch.

19. An optical device as claimed in claim 18, wherein said polarizing devices each comprise a rectangular prism split along a diagonal to accommodate said thin film layers, and mirrors are provided to redirect said split beams into a parallel arrangement.

20. An optical device as claimed in claim 18, wherein said polarizing devices each comprise a rhomboidal prism split along a median plane to accommodate said thin film layers, said prisms providing a back surface to redirect said split beams into a parallel arrangement.

21. An optical device as claimed in claim 18, wherein said polarizing devices each comprise a hexagonal prism split along a median plane to accommodate said thin film layers, and mirrors are provided to redirect said split beams into a parallel arrangement.

22. An optical device as claimed in claim 18, wherein said polarizing devices each comprise an hexagonal prism split along a median plane to accommodate said thin film layers, said s-polarized and p-polarized beams exit said first polarizing device at an angle, and mirrors are provided to redirect said split beams at an angle into respective faces of said second polarizing device.

23. An optical device as claimed in claim 18, wherein said polarizing devices each comprise an irregular hexagonal prism split along a median plane and having faces, and the angles of the faces of said hexagonal prisms are selected such that said s-polarized and p-polarized beams exit said first polarizing device in parallel and enter said second polarizing device in parallel.

24. A method of controlling the flow of light, comprising the steps of splitting a light beam incident at a first port into a reflected p-polarized beam and a transmitted s-polarized beam with a first polarizing device, passing the p-polarized and s-polarized beams through respective polarization-rotating devices, and combining beams emerging from said polarization rotating devices into an output beam at a second port with a second polarizing device, each of said first and second polarizing devices employing total internal reflection and thin film interference in a stack of alternate high and low refractive thin film layers sandwiched between two high refractive index substrates to reflect p-polarized light and transmit s-polarized light, the thickness of the thin film layers in each of said polarizing devices being such that an equivalent optical admittance of the thin film layers for s-polarized light is substantially the same as an optical admittance of the substrates for s-polarized light for a range of angles of incidence and a band of wavelengths when incident light is incident upon the low refractive index layers at an angle greater then the critical angle whereby substantially all the s-polarized light is transmitted, and the thin film layers having an equivalent optical admittance for p-polarized light that is substantially different from the optical admittance of the substrates for p-polarized light for a range of angles of incidence and a band of wavelengths, whereby substantially all the p-polarized light is reflected.

25. A method as claimed in claim 24, wherein the polarization-rotating device is a Faraday rotator associated with a waveplate.

26. A method as claimed in claim 24, wherein the direction of a magnetic field applied to said Faraday rotator is reversed to redirect said output beam to another output port.

27. In a polarization-dependent optical device for controlling the flow of light between ports, comprising at least one polarizing device, a polarization-rotating device, and a reflecting surface, the improvement wherein said at least one polarizing device comprises a stack of alternate high and low refractive index thin film layers sandwiched between two high refractive index substrates and employs frustrated total internal reflection and interference to reflect p-polarized light and to transmit s-polarized light, the thicknesses of the thin film layers being such that an equivalent optical admittance of the thin film layers for s-polarized light is substantially the same as an optical admittance of the substrates for s-polarized light for a range of angles of incidence and a band of wavelengths when incident light is incident upon the low refractive index layers at an angle greater then the critical angle whereby substantially all the s-polarized light is transmitted, and the thin film layers having an equivalent optical admittance for p-polarized light that is substantially different from the optical admittance of the substrate for p-polarized light for a range of angles of incidence and a band of wavelengths, whereby substantially all the p-polarized light is reflected.

28. An optical device as claimed in claim 27 wherein said polarization-rotating device is a waveplate.

29. An optical device as claimed in claim 27 comprising a single said polarizing device having an input port and an output port, said single polarizing device being arranged such that incident light emerging therefrom after striking said thin film layers is reflected back to said polarizing device from said reflecting surface for egress through said output port after having its plane of polarization changed by said polarization-rotating device.

30. An optical device as claimed in claim 29 wherein said polarization-rotating device is a quarterwave plate arranged such that the light passes through said polarization-rotating device in both directions.

31. An optical device as claimed in claim 30, wherein said single polarizing device comprises a diagonally split rectangular prism.

* * * * *